(12) United States Patent
Judge et al.

(10) Patent No.: US 7,903,549 B2
(45) Date of Patent: Mar. 8, 2011

(54) CONTENT-BASED POLICY COMPLIANCE SYSTEMS AND METHODS

(75) Inventors: Paul Judge, Alpharetta, GA (US); Phyllis Adele Schneck, Atlanta, GA (US); Weilai Yang, Alpharetta, GA (US); Jonathan Alexander Zdziarski, Milledgeville, GA (US)

(73) Assignee: Secure Computing Corporation, St. Paul, MN (US)

( * ) Notice: Subject to any disclaimer, the term of this patent is extended or adjusted under 35 U.S.C. 154(b) by 423 days.

(21) Appl. No.: 11/383,347

(22) Filed: May 15, 2006

(65) Prior Publication Data

US 2007/0195779 A1    Aug. 23, 2007

Related U.S. Application Data

(63) Continuation-in-part of application No. 11/173,941, filed on Jul. 1, 2005, which is a continuation-in-part of application No. 11/142,943, filed on Jun. 2, 2005, application No. 11/383,347, which is a continuation-in-part of application No. 10/093,553, filed on Mar. 8, 2002, now Pat. No. 6,941,467, and a continuation-in-part of application No. 10/094,211, filed on Mar. 8, 2002, and a continuation-in-part of application No. 10/094,266, filed on Mar. 8, 2002, now Pat. No. 7,124,438, and a continuation-in-part of application No. 10/361,091, filed on Feb. 7, 2003, now Pat. No. 7,096,498, and a continuation-in-part of application No. 10/373,325, filed on Feb. 24, 2003, now Pat. No. 7,213,260, and a continuation-in-part of application No. 10/361,067, filed on Feb. 7, 2003, now abandoned, and a continuation-in-part of application No. 10/384,924, filed on Mar. 6, 2003.

(60) Provisional application No. 60/736,121, filed on Nov. 10, 2005, provisional application No. 60/625,507, filed on Nov. 5, 2004.

(51) Int. Cl.
*H04L 12/20* (2006.01)
(52) U.S. Cl. .................... 370/230; 715/234; 709/206
(58) Field of Classification Search ........... 370/230; 455/466; 715/501.1, 510; 709/229; 707/6; 706/1

See application file for complete search history.

(56) References Cited

U.S. PATENT DOCUMENTS

| | | | |
|---|---|---|---|
| 4,289,930 | A | 9/1981 | Connolly et al. |
| 4,384,325 | A | 5/1983 | Slechta et al. |
| 4,386,416 | A | 5/1983 | Giltner et al. |

(Continued)

FOREIGN PATENT DOCUMENTS

CA          2564533         12/2005

(Continued)

OTHER PUBLICATIONS

Article entitled "An Example-Based Mapping Method for Text Categorization and Retrieval" by Yang et. al., in *ACM Transactions on Information Systems*, Jul. 1994, vol. 12, No. 3, pp. 252-277.

(Continued)

*Primary Examiner* — Albert T Chou
(74) *Attorney, Agent, or Firm* — Fish & Richardson P.C.

(57) ABSTRACT

Methods and systems for operation upon one or more data processors to filter communications of users in accordance with content-based policy.

32 Claims, 10 Drawing Sheets

U.S. PATENT DOCUMENTS

| | | |
|---|---|---|
| 4,532,588 A | 7/1985 | Foster |
| 4,713,780 A | 12/1987 | Schultz et al. |
| 4,754,428 A | 6/1988 | Schultz et al. |
| 4,837,798 A | 6/1989 | Cohen et al. |
| 4,853,961 A | 8/1989 | Pastor |
| 4,864,573 A | 9/1989 | Horsten |
| 4,951,196 A | 8/1990 | Jackson |
| 4,975,950 A | 12/1990 | Lentz |
| 4,979,210 A | 12/1990 | Nagata et al. |
| 5,008,814 A | 4/1991 | Mathur |
| 5,020,059 A | 5/1991 | Gorin et al. |
| 5,051,886 A | 9/1991 | Kawaguchi et al. |
| 5,054,096 A | 10/1991 | Beizer |
| 5,105,184 A | 4/1992 | Pirani et al. |
| 5,119,465 A | 6/1992 | Jack et al. |
| 5,144,557 A | 9/1992 | Wang |
| 5,144,659 A | 9/1992 | Jones |
| 5,144,660 A | 9/1992 | Rose |
| 5,167,011 A | 11/1992 | Priest |
| 5,210,824 A | 5/1993 | Putz et al. |
| 5,210,825 A | 5/1993 | Kavaler |
| 5,235,642 A | 8/1993 | Wobber et al. |
| 5,239,466 A | 8/1993 | Morgan et al. |
| 5,247,661 A | 9/1993 | Hager et al. |
| 5,276,869 A | 1/1994 | Forrest et al. |
| 5,278,901 A | 1/1994 | Shieh et al. |
| 5,283,887 A | 2/1994 | Zachery |
| 5,293,250 A | 3/1994 | Okumura et al. |
| 5,313,521 A | 5/1994 | Torii et al. |
| 5,319,776 A | 6/1994 | Hile et al. |
| 5,355,472 A | 10/1994 | Lewis |
| 5,367,621 A | 11/1994 | Cohen et al. |
| 5,377,354 A | 12/1994 | Scannell et al. |
| 5,379,340 A | 1/1995 | Overend et al. |
| 5,379,374 A | 1/1995 | Ishizaki et al. |
| 5,404,231 A | 4/1995 | Bloomfield |
| 5,406,557 A | 4/1995 | Baudoin |
| 5,414,833 A | 5/1995 | Hershey et al. |
| 5,416,842 A | 5/1995 | Aziz |
| 5,418,908 A | 5/1995 | Keller et al. |
| 5,424,724 A | 6/1995 | Williams et al. |
| 5,479,411 A | 12/1995 | Klein |
| 5,481,312 A | 1/1996 | Cash et al. |
| 5,483,466 A | 1/1996 | Kawahara et al. |
| 5,485,409 A | 1/1996 | Gupta et al. |
| 5,495,610 A | 2/1996 | Shing et al. |
| 5,509,074 A | 4/1996 | Choudhury et al. |
| 5,511,122 A | 4/1996 | Atkinson |
| 5,513,126 A | 4/1996 | Harkins et al. |
| 5,513,323 A | 4/1996 | Williams et al. |
| 5,530,852 A | 6/1996 | Meske, Jr. et al. |
| 5,535,276 A | 7/1996 | Ganesan |
| 5,541,993 A | 7/1996 | Fan et al. |
| 5,544,320 A | 8/1996 | Konrad |
| 5,550,984 A | 8/1996 | Gelb |
| 5,550,994 A | 8/1996 | Tashiro et al. |
| 5,557,742 A | 9/1996 | Smaha et al. |
| 5,572,643 A | 11/1996 | Judson |
| 5,577,209 A | 11/1996 | Boyle et al. |
| 5,602,918 A | 2/1997 | Chen et al. |
| 5,606,668 A | 2/1997 | Shwed |
| 5,608,819 A | 3/1997 | Ikeuchi |
| 5,608,874 A | 3/1997 | Ogawa et al. |
| 5,619,648 A | 4/1997 | Canale et al. |
| 5,632,011 A | 5/1997 | Landfield et al. |
| 5,638,487 A | 6/1997 | Chigier |
| 5,644,404 A | 7/1997 | Hashimoto et al. |
| 5,657,461 A | 8/1997 | Harkins et al. |
| 5,673,322 A | 9/1997 | Pepe et al. |
| 5,675,507 A | 10/1997 | Bobo, II |
| 5,675,733 A | 10/1997 | Williams |
| 5,677,955 A | 10/1997 | Doggett et al. |
| 5,694,616 A | 12/1997 | Johnson et al. |
| 5,696,822 A | 12/1997 | Nachenberg |
| 5,706,442 A | 1/1998 | Anderson et al. |
| 5,708,780 A | 1/1998 | Levergood et al. |
| 5,708,826 A | 1/1998 | Ikeda et al. |
| 5,710,883 A | 1/1998 | Hong et al. |
| 5,727,156 A | 3/1998 | Herr-Hoyman et al. |
| 5,740,231 A | 4/1998 | Cohn et al. |
| 5,742,759 A | 4/1998 | Nessett et al. |
| 5,742,769 A | 4/1998 | Lee et al. |
| 5,745,574 A | 4/1998 | Muftic |
| 5,751,956 A | 5/1998 | Kirsch |
| 5,758,343 A | 5/1998 | Vigil et al. |
| 5,764,906 A | 6/1998 | Edelstein et al. |
| 5,768,528 A | 6/1998 | Stumm |
| 5,771,348 A | 6/1998 | Kubatzki et al. |
| 5,778,372 A | 7/1998 | Cordell et al. |
| 5,781,857 A | 7/1998 | Hwang et al. |
| 5,781,901 A | 7/1998 | Kuzma |
| 5,790,789 A | 8/1998 | Suarez |
| 5,790,790 A | 8/1998 | Smith et al. |
| 5,790,793 A | 8/1998 | Higley |
| 5,793,763 A | 8/1998 | Mayes et al. |
| 5,793,972 A | 8/1998 | Shane |
| 5,796,942 A | 8/1998 | Esbensen |
| 5,796,948 A | 8/1998 | Cohen |
| 5,801,700 A | 9/1998 | Ferguson |
| 5,805,719 A | 9/1998 | Pare, Jr. et al. |
| 5,812,398 A | 9/1998 | Nielsen |
| 5,812,776 A | 9/1998 | Gifford |
| 5,822,526 A | 10/1998 | Waskiewicz |
| 5,822,527 A | 10/1998 | Post |
| 5,826,013 A | 10/1998 | Nachenberg |
| 5,826,014 A | 10/1998 | Coley et al. |
| 5,826,022 A | 10/1998 | Nielsen |
| 5,826,029 A | 10/1998 | Gore, Jr. et al. |
| 5,835,087 A | 11/1998 | Herz et al. |
| 5,845,084 A | 12/1998 | Cordell et al. |
| 5,850,442 A | 12/1998 | Muftic |
| 5,855,020 A | 12/1998 | Kirsch |
| 5,860,068 A | 1/1999 | Cook |
| 5,862,325 A | 1/1999 | Reed et al. |
| 5,864,852 A | 1/1999 | Luotonen |
| 5,878,230 A | 3/1999 | Weber et al. |
| 5,884,033 A | 3/1999 | Duvall et al. |
| 5,892,825 A | 4/1999 | Mages et al. |
| 5,893,114 A | 4/1999 | Hashimoto et al. |
| 5,896,499 A | 4/1999 | McKelvey |
| 5,898,836 A | 4/1999 | Freivald et al. |
| 5,903,723 A | 5/1999 | Becker et al. |
| 5,911,776 A | 6/1999 | Guck |
| 5,923,846 A | 7/1999 | Gage et al. |
| 5,930,479 A | 7/1999 | Hall |
| 5,933,478 A | 8/1999 | Ozaki et al. |
| 5,933,498 A | 8/1999 | Schneck et al. |
| 5,937,164 A | 8/1999 | Mages et al. |
| 5,940,591 A | 8/1999 | Boyle et al. |
| 5,948,062 A | 9/1999 | Tzelnic et al. |
| 5,958,005 A | 9/1999 | Thorne et al. |
| 5,963,915 A | 10/1999 | Kirsch |
| 5,978,799 A | 11/1999 | Hirsch |
| 5,987,609 A | 11/1999 | Hasebe |
| 5,991,881 A | 11/1999 | Conklin et al. |
| 5,999,932 A | 12/1999 | Paul |
| 6,003,027 A | 12/1999 | Prager |
| 6,006,329 A | 12/1999 | Chi |
| 6,012,144 A | 1/2000 | Pickett |
| 6,014,651 A | 1/2000 | Crawford |
| 6,023,723 A | 2/2000 | McCormick et al. |
| 6,029,256 A | 2/2000 | Kouznetsov |
| 6,035,423 A | 3/2000 | Hodges et al. |
| 6,052,709 A | 4/2000 | Paul |
| 6,058,381 A | 5/2000 | Nelson |
| 6,058,482 A | 5/2000 | Liu |
| 6,061,448 A | 5/2000 | Smith et al. |
| 6,061,722 A | 5/2000 | Lipa et al. |
| 6,072,942 A | 6/2000 | Stockwell et al. |
| 6,092,114 A | 7/2000 | Shaffer et al. |
| 6,092,194 A | 7/2000 | Touboul |
| 6,094,277 A | 7/2000 | Toyoda |
| 6,094,731 A | 7/2000 | Waldin et al. |
| 6,104,500 A | 8/2000 | Alam et al. |
| 6,108,688 A | 8/2000 | Nielsen |
| 6,108,691 A | 8/2000 | Lee et al. |
| 6,108,786 A | 8/2000 | Knowlson |

| | | |
|---|---|---|
| 6,118,856 A | 9/2000 | Paarsmarkt et al. |
| 6,119,137 A | 9/2000 | Smith et al. |
| 6,119,142 A | 9/2000 | Kosaka |
| 6,119,230 A | 9/2000 | Carter |
| 6,119,236 A | 9/2000 | Shipley |
| 6,122,661 A | 9/2000 | Stedman et al. |
| 6,141,695 A | 10/2000 | Sekiguchi et al. |
| 6,141,778 A | 10/2000 | Kane et al. |
| 6,145,083 A | 11/2000 | Shaffer et al. |
| 6,151,675 A | 11/2000 | Smith |
| 6,161,130 A | 12/2000 | Horvitz et al. |
| 6,185,689 B1 | 2/2001 | Todd, Sr. et al. |
| 6,192,360 B1 * | 2/2001 | Dumais et al. ............... 707/6 |
| 6,192,407 B1 | 2/2001 | Smith et al. |
| 6,199,102 B1 | 3/2001 | Cobb |
| 6,202,157 B1 | 3/2001 | Brownlie et al. |
| 6,219,714 B1 | 4/2001 | Inhwan et al. |
| 6,223,213 B1 | 4/2001 | Cleron et al. |
| 6,249,575 B1 | 6/2001 | Heilmann et al. |
| 6,249,807 B1 | 6/2001 | Shaw et al. |
| 6,260,043 B1 | 7/2001 | Puri et al. |
| 6,269,447 B1 | 7/2001 | Maloney et al. |
| 6,269,456 B1 | 7/2001 | Hodges et al. |
| 6,272,532 B1 | 8/2001 | Feinleib |
| 6,275,942 B1 | 8/2001 | Bernhard et al. |
| 6,279,113 B1 | 8/2001 | Vaidya |
| 6,279,133 B1 | 8/2001 | Vafai et al. |
| 6,282,565 B1 | 8/2001 | Shaw et al. |
| 6,285,991 B1 | 9/2001 | Powar |
| 6,289,214 B1 | 9/2001 | Backstrom |
| 6,298,445 B1 | 10/2001 | Shostack et al. |
| 6,301,668 B1 | 10/2001 | Gleichauf et al. |
| 6,304,898 B1 | 10/2001 | Shiigi |
| 6,304,973 B1 | 10/2001 | Williams |
| 6,311,207 B1 | 10/2001 | Mighdoll et al. |
| 6,317,829 B1 | 11/2001 | Van Oorschot |
| 6,320,948 B1 | 11/2001 | Heilmann et al. |
| 6,321,267 B1 | 11/2001 | Donaldson |
| 6,324,569 B1 | 11/2001 | Ogilvie et al. |
| 6,324,647 B1 | 11/2001 | Bowman-Amuah |
| 6,324,656 B1 | 11/2001 | Gleichauf et al. |
| 6,330,589 B1 | 12/2001 | Kennedy |
| 6,347,374 B1 | 2/2002 | Drake et al. |
| 6,353,886 B1 | 3/2002 | Howard et al. |
| 6,363,489 B1 | 3/2002 | Comay et al. |
| 6,370,648 B1 | 4/2002 | Diep |
| 6,373,950 B1 | 4/2002 | Rowney |
| 6,385,655 B1 | 5/2002 | Smith et al. |
| 6,393,465 B2 | 5/2002 | Leeds |
| 6,393,568 B1 | 5/2002 | Ranger et al. |
| 6,405,318 B1 | 6/2002 | Rowland |
| 6,442,588 B1 | 8/2002 | Clark et al. |
| 6,442,686 B1 | 8/2002 | McArdle et al. |
| 6,453,345 B2 | 9/2002 | Trcka et al. |
| 6,460,141 B1 | 10/2002 | Olden |
| 6,470,086 B1 | 10/2002 | Smith |
| 6,487,599 B1 | 11/2002 | Smith et al. |
| 6,487,666 B1 | 11/2002 | Shanklin et al. |
| 6,502,191 B1 | 12/2002 | Smith et al. |
| 6,516,411 B2 | 2/2003 | Smith |
| 6,519,703 B1 | 2/2003 | Joyce |
| 6,539,430 B1 | 3/2003 | Humes |
| 6,546,416 B1 | 4/2003 | Kirsch |
| 6,546,493 B1 | 4/2003 | Magdych et al. |
| 6,550,012 B1 | 4/2003 | Villa et al. |
| 6,574,737 B1 | 6/2003 | Kingsford et al. |
| 6,578,025 B1 | 6/2003 | Pollack et al. |
| 6,609,196 B1 | 8/2003 | Dickinson, III et al. |
| 6,650,890 B1 | 11/2003 | Irlam et al. |
| 6,654,787 B1 | 11/2003 | Aronson et al. |
| 6,675,153 B1 | 1/2004 | Cook et al. |
| 6,681,331 B1 | 1/2004 | Munson et al. |
| 6,687,687 B1 | 2/2004 | Smadja |
| 6,697,950 B1 | 2/2004 | Ko |
| 6,701,440 B1 | 3/2004 | Kim et al. |
| 6,704,874 B1 | 3/2004 | Porras et al. |
| 6,711,127 B1 | 3/2004 | Gorman et al. |
| 6,725,377 B1 | 4/2004 | Kouznetsov |
| 6,732,101 B1 | 5/2004 | Cook |
| 6,732,157 B1 | 5/2004 | Gordon et al. |
| 6,735,703 B1 | 5/2004 | Kilpatrick et al. |
| 6,738,462 B1 | 5/2004 | Brunson |
| 6,742,124 B1 | 5/2004 | Kilpatrick et al. |
| 6,742,128 B1 | 5/2004 | Joiner |
| 6,754,705 B2 | 6/2004 | Joiner et al. |
| 6,757,830 B1 | 6/2004 | Tarbotton et al. |
| 6,768,991 B2 | 7/2004 | Hearnden |
| 6,769,016 B2 | 7/2004 | Rothwell et al. |
| 6,775,657 B1 | 8/2004 | Baker |
| 6,792,546 B1 | 9/2004 | Shanklin et al. |
| 6,892,178 B1 | 5/2005 | Zacharia |
| 6,892,179 B1 | 5/2005 | Zacharia |
| 6,892,237 B1 | 5/2005 | Gai et al. |
| 6,895,385 B1 | 5/2005 | Zacharia et al. |
| 6,907,430 B2 | 6/2005 | Chong et al. |
| 6,910,135 B1 | 6/2005 | Grainger |
| 6,928,556 B2 | 8/2005 | Black et al. |
| 6,941,348 B2 | 9/2005 | Petry et al. |
| 6,941,467 B2 | 9/2005 | Judge et al. |
| 6,968,461 B1 | 11/2005 | Lucas et al. |
| 7,155,243 B2 * | 12/2006 | Baldwin et al. ............... 455/466 |
| 2001/0049793 A1 | 12/2001 | Sugimoto |
| 2002/0004902 A1 | 1/2002 | Toh et al. |
| 2002/0016910 A1 | 2/2002 | Wright et al. |
| 2002/0023140 A1 | 2/2002 | Hile et al. |
| 2002/0026591 A1 | 2/2002 | Hartley et al. |
| 2002/0032871 A1 | 3/2002 | Malan et al. |
| 2002/0035683 A1 | 3/2002 | Kaashoek et al. |
| 2002/0042876 A1 | 4/2002 | Smith |
| 2002/0046041 A1 | 4/2002 | Lang |
| 2002/0049853 A1 | 4/2002 | Chu et al. |
| 2002/0078382 A1 | 6/2002 | Sheikh et al. |
| 2002/0087882 A1 | 7/2002 | Schneier et al. |
| 2002/0095492 A1 | 7/2002 | Kaashoek et al. |
| 2002/0112185 A1 | 8/2002 | Hodges |
| 2002/0116627 A1 | 8/2002 | Tarbotton et al. |
| 2002/0120853 A1 | 8/2002 | Tyree |
| 2002/0133365 A1 | 9/2002 | Grey et al. |
| 2002/0138416 A1 | 9/2002 | Lovejoy et al. |
| 2002/0138755 A1 | 9/2002 | Ko |
| 2002/0138759 A1 | 9/2002 | Dutta |
| 2002/0138762 A1 | 9/2002 | Horne |
| 2002/0143963 A1 | 10/2002 | Converse et al. |
| 2002/0147734 A1 | 10/2002 | Shoup et al. |
| 2002/0152399 A1 | 10/2002 | Smith |
| 2002/0165971 A1 | 11/2002 | Baron |
| 2002/0169954 A1 | 11/2002 | Bandini et al. |
| 2002/0172367 A1 | 11/2002 | Mulder et al. |
| 2002/0178227 A1 | 11/2002 | Matsa et al. |
| 2002/0178383 A1 | 11/2002 | Hrabik et al. |
| 2002/0188864 A1 | 12/2002 | Jackson |
| 2002/0194469 A1 | 12/2002 | Dominique et al. |
| 2002/0199095 A1 | 12/2002 | Bandini et al. |
| 2003/0005326 A1 | 1/2003 | Flemming |
| 2003/0009554 A1 | 1/2003 | Burch et al. |
| 2003/0009693 A1 | 1/2003 | Brock et al. |
| 2003/0009696 A1 | 1/2003 | Bunker et al. |
| 2003/0009699 A1 | 1/2003 | Gupta et al. |
| 2003/0014664 A1 | 1/2003 | Hentunen |
| 2003/0023692 A1 | 1/2003 | Moroo |
| 2003/0023695 A1 | 1/2003 | Kobata et al. |
| 2003/0023736 A1 * | 1/2003 | Abkemeier ............... 709/229 |
| 2003/0023873 A1 | 1/2003 | Ben-Itzhak |
| 2003/0023874 A1 | 1/2003 | Prokupets et al. |
| 2003/0023875 A1 | 1/2003 | Hursey et al. |
| 2003/0028803 A1 | 2/2003 | Bunker et al. |
| 2003/0033516 A1 | 2/2003 | Howard et al. |
| 2003/0033542 A1 | 2/2003 | Goseva-Popstojanova et al. |
| 2003/0041264 A1 | 2/2003 | Black et al. |
| 2003/0046253 A1 * | 3/2003 | Shetty et al. ............... 706/1 |
| 2003/0051026 A1 | 3/2003 | Carter et al. |
| 2003/0051163 A1 | 3/2003 | Bidaud |
| 2003/0051168 A1 | 3/2003 | King et al. |
| 2003/0055931 A1 | 3/2003 | Cravo De Almeida et al. |
| 2003/0061506 A1 | 3/2003 | Cooper et al. |
| 2003/0065943 A1 | 4/2003 | Geis et al. |
| 2003/0084280 A1 | 5/2003 | Bryan et al. |
| 2003/0084320 A1 | 5/2003 | Tarquini et al. |

| | | | |
|---|---|---|---|
| 2003/0084323 A1 | 5/2003 | Gales | |
| 2003/0084347 A1 | 5/2003 | Luzzatto | |
| 2003/0088792 A1 | 5/2003 | Card et al. | |
| 2003/0093667 A1 | 5/2003 | Dutta et al. | |
| 2003/0093695 A1 | 5/2003 | Dutta | |
| 2003/0093696 A1 | 5/2003 | Sugimoto | |
| 2003/0095555 A1 | 5/2003 | McNamara et al. | |
| 2003/0097439 A1 | 5/2003 | Strayer et al. | |
| 2003/0097564 A1 | 5/2003 | Tewari et al. | |
| 2003/0105976 A1 | 6/2003 | Copeland, III | |
| 2003/0110392 A1 | 6/2003 | Aucsmith et al. | |
| 2003/0110396 A1 | 6/2003 | Lewis et al. | |
| 2003/0115485 A1 | 6/2003 | Milliken | |
| 2003/0115486 A1 | 6/2003 | Choi et al. | |
| 2003/0123665 A1 | 7/2003 | Dunstan et al. | |
| 2003/0126464 A1 | 7/2003 | McDaniel et al. | |
| 2003/0126472 A1 | 7/2003 | Banzhof | |
| 2003/0135749 A1 | 7/2003 | Gales et al. | |
| 2003/0140137 A1 | 7/2003 | Joiner et al. | |
| 2003/0140250 A1 | 7/2003 | Taninaka et al. | |
| 2003/0145212 A1 | 7/2003 | Crumly | |
| 2003/0145225 A1 | 7/2003 | Bruton, III et al. | |
| 2003/0145226 A1 | 7/2003 | Bruton, III et al. | |
| 2003/0149887 A1 | 8/2003 | Yadav | |
| 2003/0149888 A1 | 8/2003 | Yadav | |
| 2003/0154393 A1 | 8/2003 | Young | |
| 2003/0154399 A1 | 8/2003 | Zuk et al. | |
| 2003/0154402 A1 | 8/2003 | Pandit et al. | |
| 2003/0158905 A1 | 8/2003 | Petry et al. | |
| 2003/0159069 A1 | 8/2003 | Choi et al. | |
| 2003/0159070 A1 | 8/2003 | Mayer et al. | |
| 2003/0167402 A1 | 9/2003 | Stolfo et al. | |
| 2003/0172166 A1 | 9/2003 | Judge et al. | |
| 2003/0172167 A1 | 9/2003 | Judge et al. | |
| 2003/0172289 A1 | 9/2003 | Soppera | |
| 2003/0172291 A1 | 9/2003 | Judge et al. | |
| 2003/0172292 A1 | 9/2003 | Judge | |
| 2003/0172294 A1 | 9/2003 | Judge | |
| 2003/0172301 A1 | 9/2003 | Judge et al. | |
| 2003/0172302 A1 | 9/2003 | Judge et al. | |
| 2003/0187996 A1 | 10/2003 | Cardina et al. | |
| 2003/0212791 A1 | 11/2003 | Pickup | |
| 2003/0233328 A1 | 12/2003 | Scott et al. | |
| 2004/0015554 A1 | 1/2004 | Wilson | |
| 2004/0025044 A1 | 2/2004 | Day | |
| 2004/0054886 A1 | 3/2004 | Dickinson et al. | |
| 2004/0058673 A1 | 3/2004 | Irlam et al. | |
| 2004/0059811 A1 | 3/2004 | Sugauchi et al. | |
| 2004/0088570 A1 | 5/2004 | Roberts et al. | |
| 2004/0111531 A1 | 6/2004 | Staniford et al. | |
| 2004/0139160 A1 | 7/2004 | Wallace et al. | |
| 2004/0139334 A1 | 7/2004 | Wiseman | |
| 2004/0177120 A1 | 9/2004 | Kirsch | |
| 2004/0203589 A1 | 10/2004 | Wang et al. | |
| 2004/0205135 A1 | 10/2004 | Hallam-Baker et al. | |
| 2004/0267893 A1 | 12/2004 | Lin | |
| 2005/0021778 A1 | 1/2005 | Goeller et al. | |
| 2005/0052998 A1 | 3/2005 | Oliver et al. | |
| 2005/0060643 A1* | 3/2005 | Glass et al. | 715/501.1 |
| 2005/0065810 A1 | 3/2005 | Bouron | |
| 2005/0102366 A1 | 5/2005 | Kirsch | |
| 2005/0160148 A1 | 7/2005 | Yu | |
| 2005/0204001 A1 | 9/2005 | Stein et al. | |
| 2005/0262209 A1 | 11/2005 | Yu | |
| 2005/0262210 A1 | 11/2005 | Yu | |
| 2006/0036727 A1 | 2/2006 | Kurapati et al. | |
| 2006/0042483 A1 | 3/2006 | Work et al. | |
| 2006/0095404 A1 | 5/2006 | Adelman et al. | |
| 2006/0123083 A1 | 6/2006 | Goutte et al. | |
| 2006/0212925 A1 | 9/2006 | Shull et al. | |
| 2006/0212930 A1 | 9/2006 | Shull et al. | |
| 2006/0212931 A1 | 9/2006 | Shull et al. | |
| 2006/0230039 A1 | 10/2006 | Shull et al. | |
| 2006/0253458 A1 | 11/2006 | Dixon et al. | |

FOREIGN PATENT DOCUMENTS

| | | |
|---|---|---|
| EP | 0375138 A2 | 6/1990 |
| EP | 0413537 A2 | 2/1991 |
| EP | 0420779 A2 | 4/1991 |
| EP | 0720333 A2 | 7/1996 |
| EP | 0838774 A2 | 4/1998 |
| EP | 0869652 A2 | 10/1998 |
| EP | 0907120 A2 | 4/1999 |
| EP | 1326376 | 7/2003 |
| EP | 1271846 | 7/2005 |
| GB | 2271002 A | 3/1994 |
| JP | 18350870 | 12/2006 |
| KR | 2006-0012137 | 2/2006 |
| KR | 1020060041934 | 5/2006 |
| WO | WO 96/35994 A1 | 11/1996 |
| WO | WO 99/05814 A2 | 2/1999 |
| WO | WO 99/33188 A2 | 7/1999 |
| WO | WO 99/37066 A1 | 7/1999 |
| WO | WO 00/42748 A1 | 7/2000 |
| WO | WO 01/17165 A2 | 3/2001 |
| WO | WO 01/50691 A2 | 7/2001 |
| WO | WO 01/76181 A2 | 10/2001 |
| WO | WO 02/13469 A2 | 2/2002 |
| WO | WO 02/13489 A2 | 2/2002 |
| WO | WO 02/75547 A1 | 9/2002 |
| WO | 02/082293 | 10/2002 |
| WO | WO 02/091706 A1 | 11/2002 |
| WO | 2004/061698 | 7/2004 |
| WO | WO 2004/061703 | 7/2004 |
| WO | WO 2004081734 | 9/2004 |
| WO | 2005/086437 | 9/2005 |
| WO | WO 2005116851 | 12/2005 |

OTHER PUBLICATIONS

Article entitled "A Comparison of Two Learning Algorithms for Text Categorization" by Lewis et al., in *Third Annual Symposium on Document Analysis and information Retrieval*, Apr. 11-13, 1994, pp. 81-92.

Article entitled "Learning Limited Dependence Bayesian Classifiers" by Sahami, in *Proceedings of the Second International Conference on Knowledge Discovery and Data Mining*, 1996, pp. 335-338.

Article entitled "An Evaluation of Phrasal and Clustered Representations on a Text Categorization Task" by Lewis, in *15th Ann Int'l, SIGIR*, Jun. 1992, pp. 37-50.

Book entitled *Machine Learning* by Mitchell, 1997, pp. 180-184.

Article entitled "Learning Rules that Classify E-mail" by Cohen, pp. 1-8. Date unknown.

Article entitled "Hierarchically classifying documents using very few words" by Koller et. al., in *Proceedings of the Fourteenth International Conference on Machine Learning*, 1997.

Article entitled "Classification of Text Documents" by Li et. al., in *The Computer Journal*, vol. 41, No. 8, 1998, pp. 537-546.

Article entitled "Issues when designing filters in messaging systems" by Palme et. al., in 19 *Computer Communications*, 1996, pp. 95-101.

Article entitled "Text Categorization with Support Vector Machines: Learning with Many Relevant Features" by Joachins in *Machine Learning: ECML-98*, Apr. 1998, pp. 1-14.

Article entitled "Hierarchical Bayesian Clustering for Automatic Text Classification" by Iwayarna et al. in *Natural Language*, pp. 1322-1327. Date unknown.

Article entitled "Smokey: Automatic Recognition of Hostile Messages" by Spertus in *Innovative Applications* 1997, pp. 1058-1065.

Article entitled "A Comparison of Classifiers and Document Representations for the Routing Problem" by Schutze. Date unknown.

Article entitled "CAFE: A Conceptual Model for Managing Information in Electronic Mail" by Takkinen et al. in *Proc. 31st Annual Hawaii International Conference on System Sciences*, 1998, pp. 44-53.

Article entitled "A Comparative Study on Feature Selection in Text Categorization" by Yang et. al. Date unknown.

Article entitled "Spam!" by Cranor et. al. in *Communication Of The ACM*, vol. 41, No. 8, Aug. 1998, pp. 74-83.

Article entitled "Sendmail and Spam" by LeFebvre in *Performance Computing*, Aug. 1998, pp. 55-58.

Article entitled "Implementing a Generalized Tool for Network Monitoring" by Ranum et. al. in *Lisa XI*, Oct. 26-31, 1997, pp. 1-8.

Article entitled "Method for Automatic Contextual Transposition Upon Receipt of Item Of Specified Criteria" printed Feb. 1994 in *IBM Technical Disclosure Bulletin*, vol. 37, No. 2B, p. 333.

Article entitled "Toward Optimal Feature Selection" by Koller et al., in *Machine Learning: Proc. of the Thirteenthe International Conference*, 1996.
Website: Technical Focus—Products—Entegrity AssureAccess. www2.entegrity.com.
Website: Create Secure Internet Communication Channels—Atabok Homepage. www.atabok.com.
Website: ATABOK VCNMAIL™ Secure Email Solution—Atabok Related Produces www.atabok.com.
Website: ATABOK VCN Auto-Exchange™—Atabok Related Produces. www.atabok.com.
Website: Controlling Digital Assets Is a Paramount Need for All Business—Atabok Related Produces. www.atabok.com.
Website: Control Your Confidential Communications with ATABOK—Atabok Related Produces. www.atabok.com.
Website: Entrust Entelligence—Entrust Homepage. www.entrust.com.
Website: E-mail Plug-in—Get Technical/Interoperability—Entrust Entelligence. www.entrust.com.
Website: E-mail Plug-in—Get Technical/System Requirements—Entrust Entelligence. www.entrust.com.
Website: E-mail Plug-in—Features and Benefits—Entrust Entelligence. www.entrust.com.
Website: Internet Filtering Software—Internet Manager Homepage. www.elronsw.com.
Website: ESKE—Email with Secure Key Exchange—ESKE. www.danu.ie.
Website: Terminet—ESKE. www.danu.ie.
Website: Baltimore Focus on e-Security—Baltimore Technologies. www.baltimore.com.
Website: Go Secure! for Microsoft Exchange—Products/Services—Verisign, Inc. www.verisign.com.
Article entitled "MIMEsweeper defuses virus network, 'net mail bombs" by Avery, in *InfoWorld*, May 20, 1996, vol. 12, No. 21, p. N1.
Article entitled "Stomping out mail viruses" by Wilkerson, in *PC Week*, Jul. 15, 1996, p. N8.
Article entitled "Securing Electronic Mail Systems" by Serenelli et al., in *Communications-Fusing Command Control and Intelligence: MILCOM '92*, 1992, pp. 677-680.
Article entitled "Integralis' Minesweeper defuses E-mail bombs" by Kramer et. al., in *PC Week*, Mar. 18, 1996, p. N17-N23.
Article entitled "A Toolkit and Methods for Internet Firewalls" by Ranum et. al., in *Proc. of USENIX Summer 1994 Technical Conference*, Jun. 6-10, 1994, pp. 37-44.
Article entitled "Firewall Systems: The Next Generation" by McGhie, in *Integration Issues in Large Commercial Media Delivery Systems: Proc. of SPIE—The International Society for Optical Engineering*, Oct. 23-24, 1995, pp. 270-281.
Article entitled "Design of the TTI Prototype Trusted Mail Agent" by Rose et. al., in *Computer Message Systems-85: Proc. of the IFIP TC 6 International Symposium on Computer Message Systems*, Sep. 5-7, 1985, pp. 377-399.
Article entitled "Designing an Academic Firewall: Policy, Practice, and Experience with SURF" by Greenwald et. al., in *Proc. of the 1996 Symposium on Network and Distributed Systems Security*, 1996, pp. 1-14.
Article entitled "X Through the Firewall, and Other Application Relays" by Treese et. al. in *Proc. of the USENIX Summer 1993 Technical Conference*, Jun. 21-25, 1993, pp. 87-99.
Article entitled "Firewalls For Sale" by Bryan, in *BYTE*, Apr. 1995, pp. 99-104.
Article entitled "A DNS Filter and Switch for Packet-filtering Gateways" by Cheswick et al., in *Proc. of the Sixth Annual USENIX Security Symposium: Focusing on Applications of Cryptography*, Jul. 22-25, 1996, pp. 15-19.
Article entitled "Safe Use of X Window System Protocol Across A Firewall" by Kahn, in *Proc. of the Fifth USENIX UNIX Security Symposium*, Jun. 5-7, 1995, pp. 105-116.
Article entitled "Automating the OSI to Internet Management Conversion Through the Use of an Object-Oriented Platform" by Pavlou et al., in *Proc. of the IFIP TC6/WG6.4 International Conference on Advanced Information Processing Techniques for LAN and MAN Management*, Apr. 7-9, 1993, pp. 245-260.
Article entitled "A Secure Email Gateway (Building an RCAS External Interface)" by Smith, in *Tenth Annual Computer Security Applications Conference*, Dec. 5-9, 1994, pp. 202-211.
Article entitled "Secure External References in Multimedia Email Messages" by Wiegel, in *3rd ACM Conference on Computer and Communications Security*, Mar. 14-16, 1996, pp. 11-18.
Memo entitled "SOCKS Protocol Version 5" by Leech et. al., In *Standards Track*, Mar. 1996, pp. 1-9.
Article entitled "Securing the Web: fire walls, proxy servers, and data driven attacks" by Farrow in *InfoWorld*, Jun. 19, 1995, vol. 17, No. 25, p. 103.
Edakandi, Ashwin Examiner's Report for Australian Patent Application No. 2006315184, dated Mar. 31, 2010, 8 pages.
China Patent Agent (H.K.) Ltd., First Office Action for Chinese Patent Application No. 200680050707.7, dated Mar. 9, 2010, 31 pages.
Supplementary European Search Report, PCT Application No. PCT/US2006060771, dated Dec. 3, 2010, 7 pages.

* cited by examiner

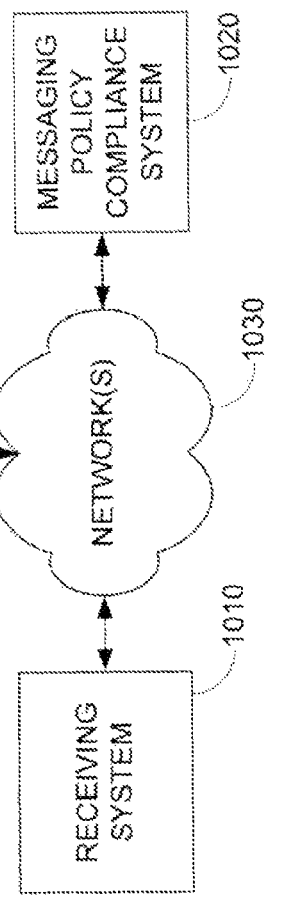
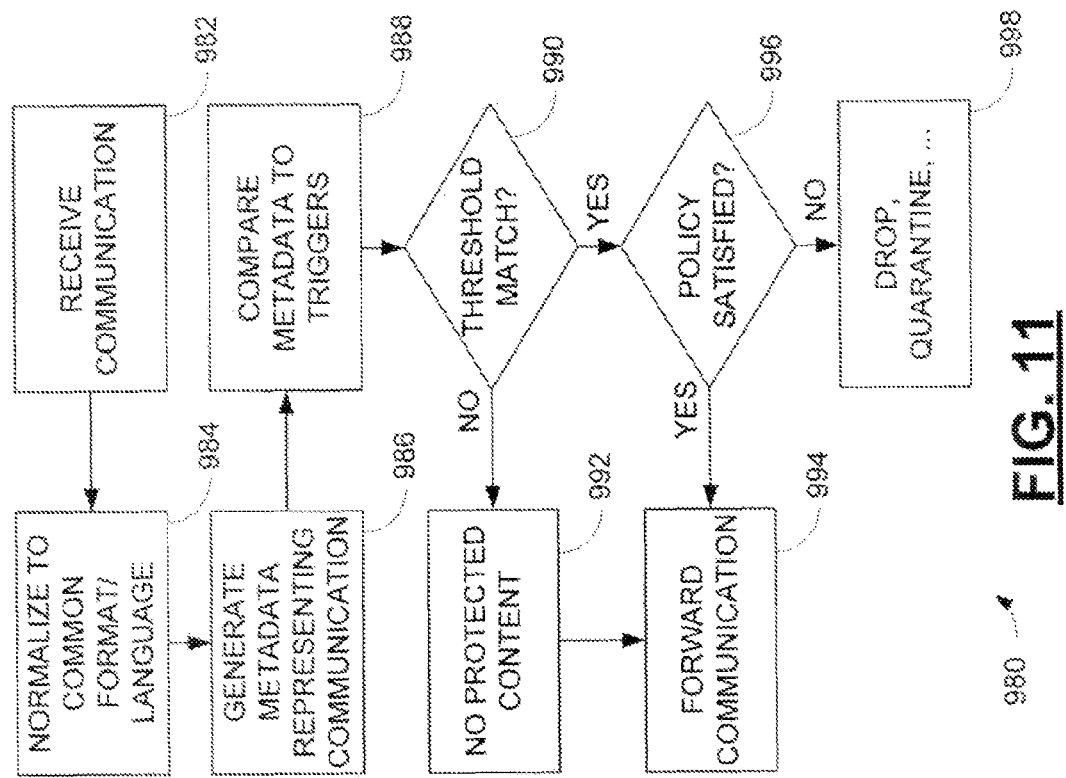
FIG. 12
FIG. 11

CONTENT-BASED POLICY COMPLIANCE SYSTEMS AND METHODS

CROSS-REFERENCE TO RELATED APPLICATIONS

This application claims priority to and the benefit of commonly assigned U.S. Provisional Application Ser. No. 60/736,121, entitled "CONTENT-BASED POLICY COMPLIANCE SYSTEMS AND METHODS," filed Nov. 10, 2005, which is incorporated herein by reference in its entirety.

This application is continuation-in-part of and claims priority to and the benefit of commonly assigned U.S. application Ser. No. 11/173,941, entitled "MESSAGE PROFILING SYSTEMS AND METHODS," filed on Jul. 1, 2005, which is a continuation-in-part of, and claims priority to and benefit of U.S. application Ser. No. 11/142,943, entitled "SYSTEMS AND METHODS FOR CLASSIFICATION OF MESSAGING ENTITIES," filed on Jun. 2, 2005, both of which claim priority to and benefit of U.S. Provisional Application Ser. No. 60/625,507, entitled "Classification of Messaging Entities," filed on Nov. 5, 2004, all of which are incorporated herein by reference in their entirety.

This application is a continuation-in-part of and claims priority to and the benefit of commonly assigned U.S. patent application Ser. No. 10/093,553, entitled "SYSTEMS AND METHODS FOR ADAPTIVE MESSAGE INTERROGATION THROUGH MULTIPLE QUEUES," U.S. patent application Ser. No. 10/094,211, entitled "SYSTEMS AND METHODS FOR ENHANCING ELECTRONIC COMMUNICATION SECURITY," and U.S. patent application Ser. No. 10/094,266, entitled "SYSTEMS AND METHODS FOR ANOMALY DETECTION IN PATTERNS OF MONITORED COMMUNICATION," all filed on Mar. 8, 2002, each of which are hereby incorporated by reference in their entirety.

This application is also a continuation in part of and claims priority to and the benefit of commonly assigned U.S. patent application Ser. No. 10/361,091, filed Feb. 7, 2003, entitled "SYSTEMS AND METHODS FOR MESSAGE THREAT MANAGEMENT," U.S. patent application Ser. No. 10/373,325, filed Feb. 24, 2003, entitled "SYSTEMS AND METHODS FOR UPSTREAM THREAT PUSHBACK," U.S. patent application Ser. No. 10/361,067, filed Feb. 7, 2003, entitled "SYSTEMS AND METHODS FOR AUTOMATED WHITELISTING IN MONITORED COMMUNICATIONS," and U.S. patent application Ser. No. 10/384,924, filed Mar. 6, 2003, entitled "SYSTEMS AND METHODS FOR SECURE COMMUNICATION DELIVERY." The entire disclosure of all these applications is incorporated herein by reference.

BACKGROUND AND SUMMARY

This document relates generally to systems and methods for processing communications and more particularly to systems and methods for filtering communications.

In the electronic mail filtering industry, most existing systems are aimed at filtering incoming messages. Content policy compliance (e.g., compliance with corporate or governmental policy) can be an important consideration for companies in view of the increasingly electronic character of important communications and availability of a variety of electronic communication techniques.

In accordance with the teachings disclosed herein, methods and systems are provided for operation upon one or more data processors to filter communications in accordance with content based policy compliance. For example, a method and system can include: defining a classification associated with the content of a class of files; receiving a set of characteristics distinctive to the classification; wherein the set of characteristics has been derived based upon the set of files; receiving a rule defining the treatment of content substantially similar to the set of characteristics; and, wherein the rule defines whether to forward a communication to a recipient based upon the classification of the content and at least one of the recipient or the sender.

BRIEF DESCRIPTION OF THE DRAWINGS

FIG. 11 is a flowchart depicting an operational scenario for converting communications from multiple formats and/or languages into a common format and/or language and distilling the communication into metadata describing the communication prior to parsing the message for any content match.

FIG. 12 is a block diagram depicting a server access architecture.

DETAILED DESCRIPTION

Figure 1:
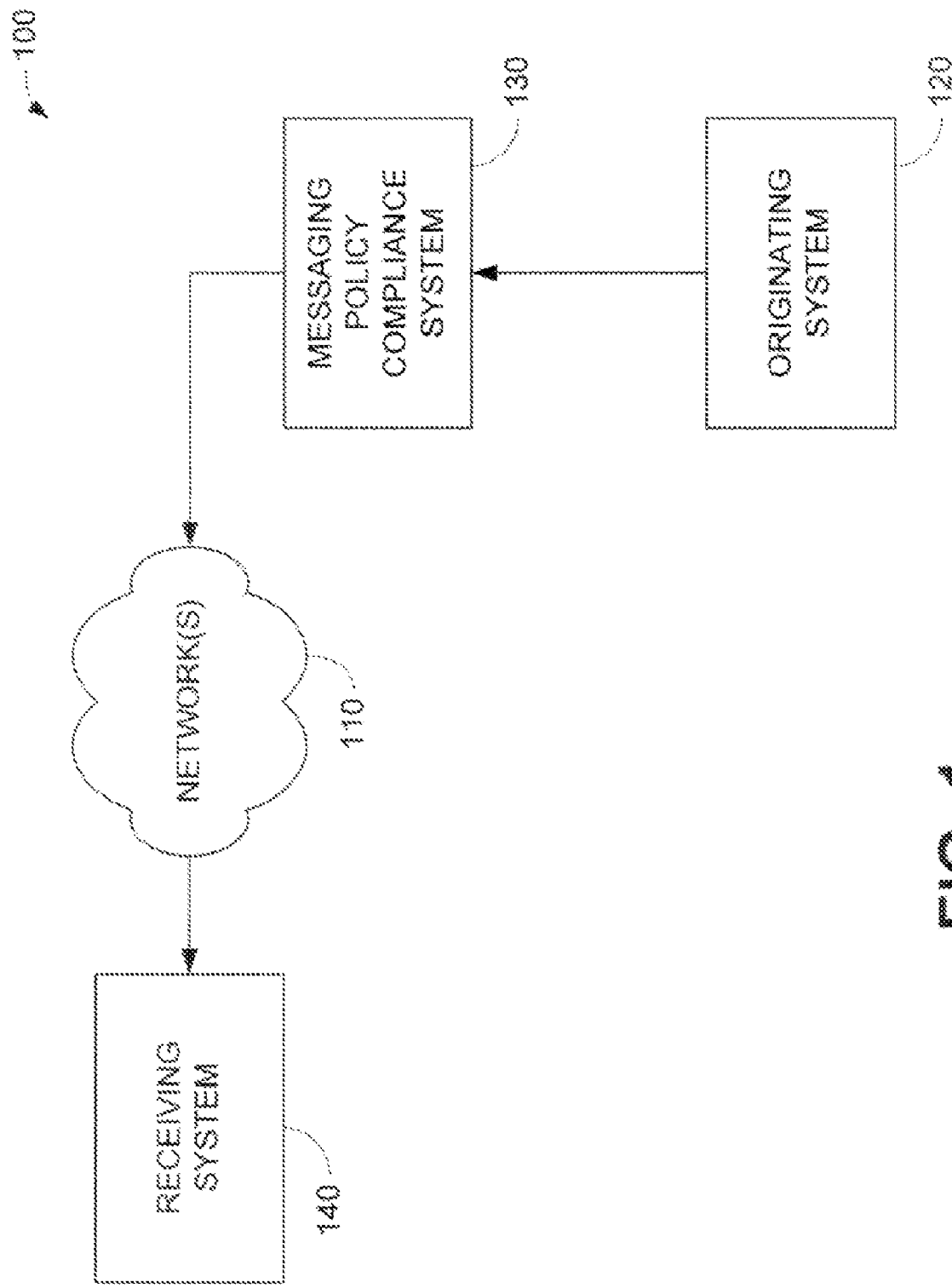
FIG. 1 is a block diagram depicting a system for handling transmissions being sent over a network.

FIG. 1 depicts at 100 a system for handling transmissions received over a network 110. The transmissions can be many different types of communications, such as electronic mail (e-mail) messages sent from one or more messaging entities 120. The system 100 uses a messaging policy compliance system 130 to help process the communications from an originating system 120. The messaging policy compliance system 130 examines characteristics associated with the communications from the originating system 120, and based upon the examination, an action is taken with respect to the communications. For example, a communication may be determined to be legitimate and thus the communication should not be filtered by the messaging policy compliance system 130 and instead provided to a receiving system 140 for delivery to the intended recipient.

This disclosure relates to filtering the content of packets communicated over the network based upon a classification associated with the communication. It should therefore be understood that such communications can include e-mail, voice over internet protocol (VoIP) packets, instant messaging (IM), file transfer protocol (FTP) packets, hypertext transfer protocol (HTTP) packets, Gopher packets, and any other method whereby protected or sensitive content (e.g., trade secrets, privileged information, etc.) can be transferred over a network to another user.

It should be further understood that an organization often includes several departments which operate, to some degree, independently of one another. However, an organization may wish to prevent theft or disclosure of information based upon the person accessing the information, or based upon the person to whom the information is being sent. For example, an organization may not want engineering content disclosed to persons outside of the organization. Thus, the organization desires to limit the recipients of messages that include content related to engineering. However, traditional filtering systems do not provide an accurate classification of content being sent to/from users within an organization.

Figure 2:
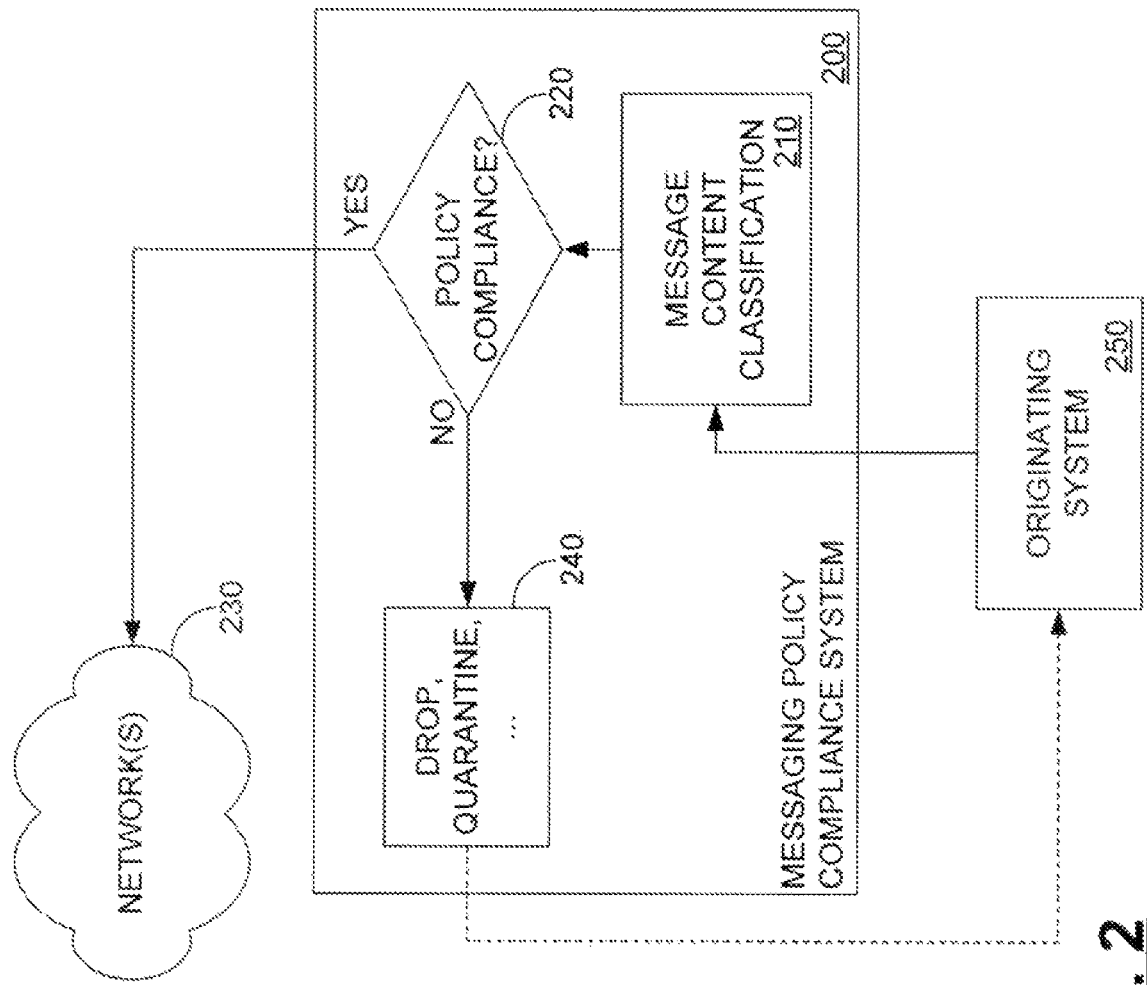
FIG. 2 is a block diagram depicting a compliance system that has been configured for classifying files and applying policies.

To increase the accuracy of classifying content associated with messages property (e.g., engineering files, marketing files, legal files, etc., including text documents, voice recordings, images, drawings, among others), a messaging policy compliance system 200 can be configured with a message content classification program 210 as shown in FIG. 2. A message content classification program 210 can use one or more message classification techniques or filters to classify message content.

The message content classification program 210 analyzes the content of a communication (included to travel across the network to a recipient) in order to classify the content of the communication. However, it should be understood that the messaging policy compliance system can also inspect incoming communications before distributing the communications to a receiving system. The messaging policy compliance system 200 compares at 220 the classification produced by the message content classification program 210 to a set of one or more rules to determine whether the message is in compliance with policy.

If the communication is in compliance with the organization's policies, the communication is forwarded to a recipient via the network 230. However, if the communication is not in compliance with the organization's policies, the communication is quarantined, dropped, notify an administrator or a sender/recipient, or take other action, as illustrated by block 240. Other actions can include, for example, stripping content and/or attachment of the message before forwarding, automatically encrypting the message before forwarding, delay delivery of the message, or other appropriate actions in response to a compliance violation. It should be understood that automatic encryption can include requesting a user or administrator's approval to encrypt. Moreover, automatic encryption can further include completely automating the decision to encrypt content at the server or client level, in accordance with policy and without user or administrator approval.

If only a portion of the communication is not in compliance with the organization's policies (e.g., a message contains two attachments where one complies with the policy(ies) and the other does not), the communication may be blocked (e.g., dropped, quarantined, etc.). Alternatively, such a communication could be automatically redacted by the messaging policy compliance system 200, such that it complies with the organization's policy(ies). Moreover, in the event that message cannot be transferred to a recipient because of a policy violation, a notification can be delivered to the originating system. It should be noted that the originating system can notify a system administrator. Alternatively, a system administrator can be notified directly by the messaging policy compliance system. It should be understood that there are numerous ways to manage a response to policy violations, each of which is intended to be included within the scope of this disclosure.

Figure 3:
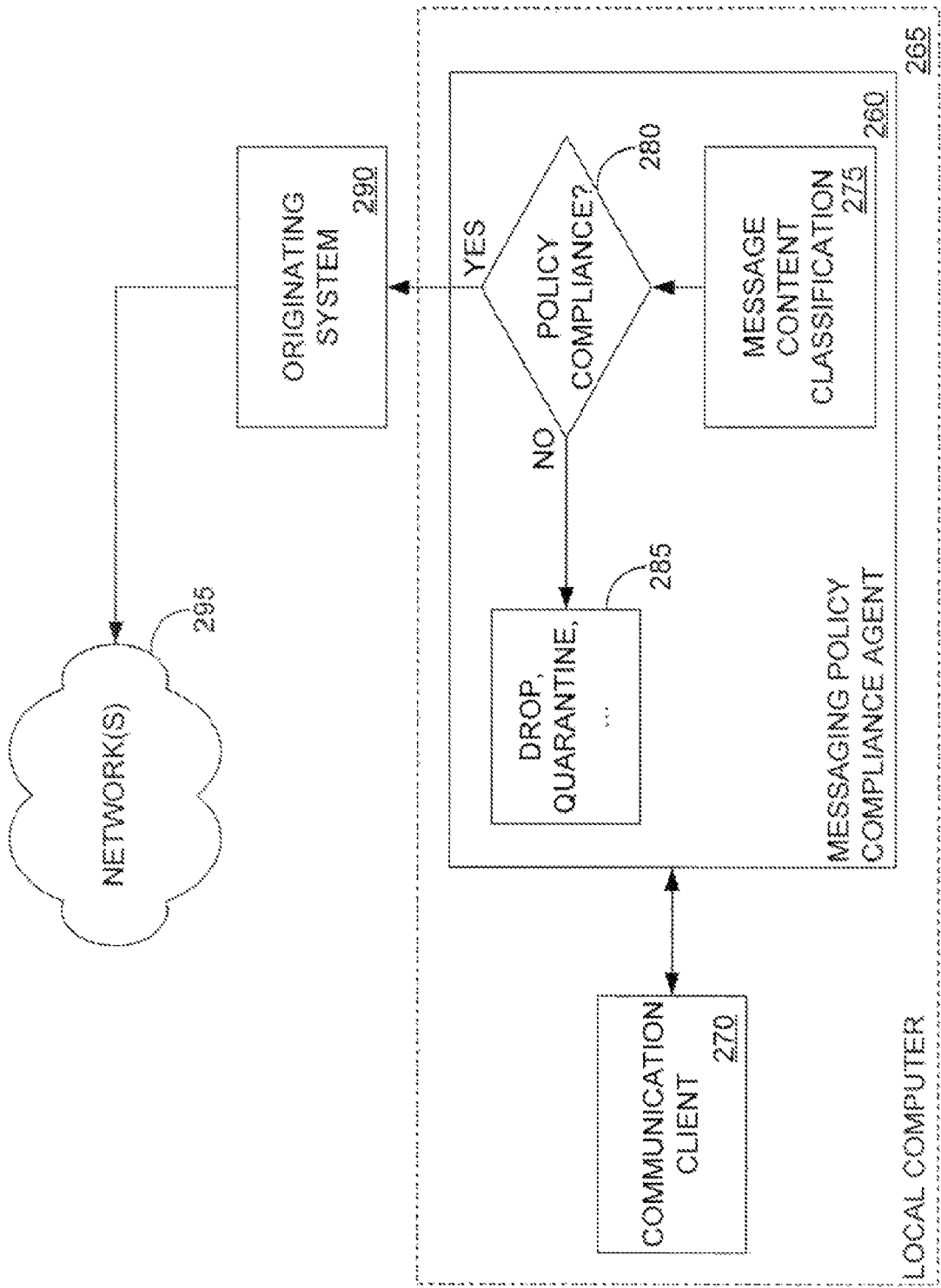
FIG. 3 is a block diagram depicting a compliance system operating on a local computer.

Another example of a messaging policy compliance system is shown in FIG. 3. For example, the messaging policy compliance agent 260 is located on a user's computer 256. In addition to the messaging policy compliance agent 260, the local computer 265 can include an communication client 270. It should be understood that the communication client 270 could be integrated with the messaging policy compliance agent 260, in some examples.

Upon receiving a message from the communication client 270, the messaging policy compliance agent 260 would use the message content classification program 275 to determine a classification associated with the content of the communication. The messaging policy compliance agent 260 at 220 compares the classification associated with the content of the communication with a content-based messaging policy which could be set by the user, or by a system administrator. Where the communication does not comply with a content-based messaging policy, the agent can drop the communication, quarantine the communication, etc. as shown by block 285. It should be understood that such functionality could be integrated with the communication client. However, it should also be noted that the functionality of block 285 could be provided by the agent itself.

If the communication complies with the content-based policy(ies), the messaging policy compliance agent forwards the message to the originating system 290. It should be understood that the functionality of the originating system 290 could be included on the local computer 265 itself. The originating system 290 then sends the message to a recipient system via network(s) 295.

It should be noted that the messaging policy compliance agent can be used in conjunction with a messaging policy compliance server. Using such an architecture could provide multiple levels of content compliance checks. The agent/server architecture could allow the messaging policy compliance agent to record the user's activity and/or various events that occur on the computer (e.g., policy violations), and periodically provide updates of the user's activity to a messaging policy compliance server. The agent/server architecture could further allow the messaging policy server to periodically communicate updated content-based policy(ies) to the agent. It should be further noted that a messaging policy compliance agent 260, where practicable, can include any of the functionality of a messaging policy compliance system as described in the present disposure. As such, any of the functionality described with respect to a messaging policy compliance system can be used on a messaging policy compliance agent in accordance with the present disclosure.

The messaging policy compliance agent could further allow a user to request the addition of content-based policy (ies) at the local or server level. Where the requested content-based policy(ies) do not conflict with administrator content-based policy(ies), the local and/or server could apply the user requested content-based policy. Further, the messaging policy compliance agent could allow the user to request encryption on a communication via the communication client interface. Where the encryption request complies with content-based policy(ies) at the agent and/or server level, the requested encryption can be performed by either the server or the agent.

Figure 4:
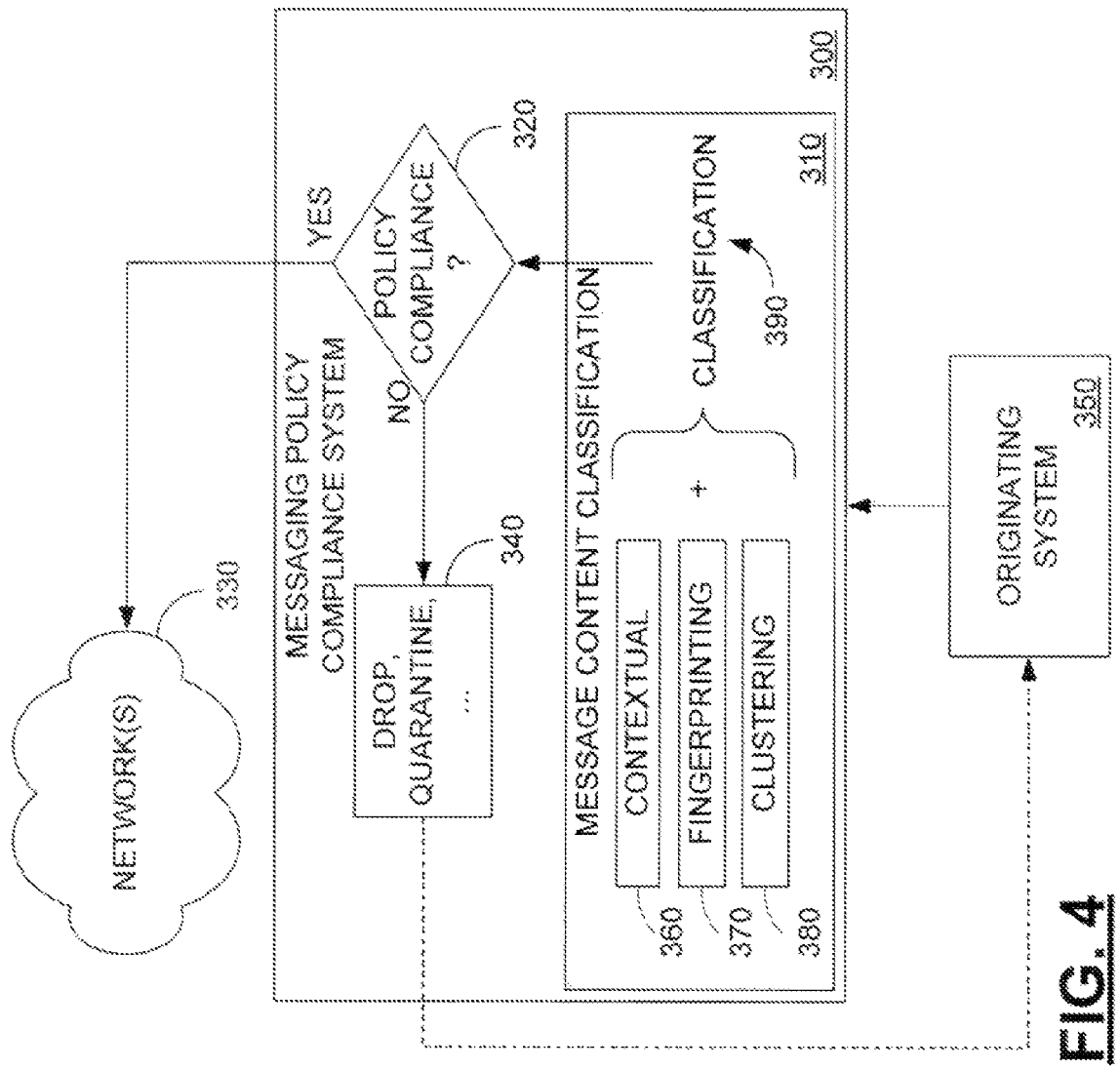
FIG. 4 is a block diagram depicting a compliance system that has been configured for classifying files based upon a combination of analysis techniques.

By way of example, a message content classification program 310, as shown in FIG. 4, can include a number of classification techniques 360, 370, 380. Example message content classification techniques or filters 360, 370, 380 that a message content classification program 310 can use include:

- Contextual Analysis—a classification technique that performs a Markovian analysis of files to identify phases and words which are unique to a classification of file, which can be done by analyzing the rarity of a word or phrase to a particular type of file, and treating such words or phrases as indicative of a group of files with some percentage of certainty.
- Fingerprint Analysis—a technique to identify copying between two electronic texts at multiple levels (e.g. whole file, paragraph, sentence, or unstructured alphanumeric components) by, for example: 1) Applying a normalization layer to remove whitespace and other noise; and, 2) utilizing a winnowing algorithm to generate a minimized, yet optimal number of hashes for each file, adding an ambiguity factor to identify files with very minimal, but significant duplications of data.
- Cluster Analysis—a classification technique that partitions the data into related subsets sharing a common trait that can be defined as a function of a defined distance measure (e.g., Euclidian distance) that marks a point as a part of at least one cluster.
- Adaptive Lexical Analysis—a classification technique which can be performed on electronic text or data which adaptively learns structures of sparse and nonsparse patterns by, for example: 1) Instantiating a series of Markov chains using components of the presented classification medium as members; and, 2) Applying a series of weights based on the complexity of the chain, factored with the learned appearance vectors of each chain to deduce a probability. This process allows for the learning and identification of sparse patterns, exact phrases, words, or binary patterns which have a probability of one disposition based on their historical occurrence across a continually building corpus, using the original medium as a process of continuing self-calibration.

It should be understood that these analysis techniques can be modified (sometimes significantly) based upon the desired results, and the all implementations of these analysis techniques are intended to be included within the present disclosure. For example, the cluster analysis filter 380 can use a number of different algorithms to identify clusters, such available techniques can include, for example, but not limited to: k-means clustering, quality threshold (QT) clustering, fuzzy c-means clustering, and spectral clustering, among others.

Thus, it should be recognized that using a combination of classification algorithms on the content passing through the messaging policy compliance system 300 can provide a classification 390 associated with the content, and make a determination, as shown by decision block 320, whether the content of the message complies with content policy. Where the content complies with content policy the message is forwarded to a recipient system via a network 330. Where the content does not comply with content policy, the content can be dropped, quarantined, etc. as shown by block 340. Where the message is not forwarded to the recipient system, the messaging policy compliance system 300 can notify a sender, an originating system 350 and/or an administrator (not shown).

As an example, a policy could limit engineering-type information from being transmitted by human resources staff or to individuals outside of the company. The message content classification could identify engineering-type information, for example, by the inclusion of equations or words or phrases that are most commonly associated with engineering documents, presentations or drawings—and/or one of the classification techniques previously listed in this application. Communications identified as including characteristics in common with engineering documents, presentations or drawings would be tested by examining a message header to determine whether the sender was a human resources employee, or whether the recipient domain was not associated with the company.

It should be understood that using this method, an administrator could identify an individual suspected of leaking information. This individual could be monitored for compliance with company policy. Moreover, the message content classification program 310 can detect situation where the user is sending subsets of files, or where the individual is summarizing or rewording documents to avoid detection.

Figure 5:
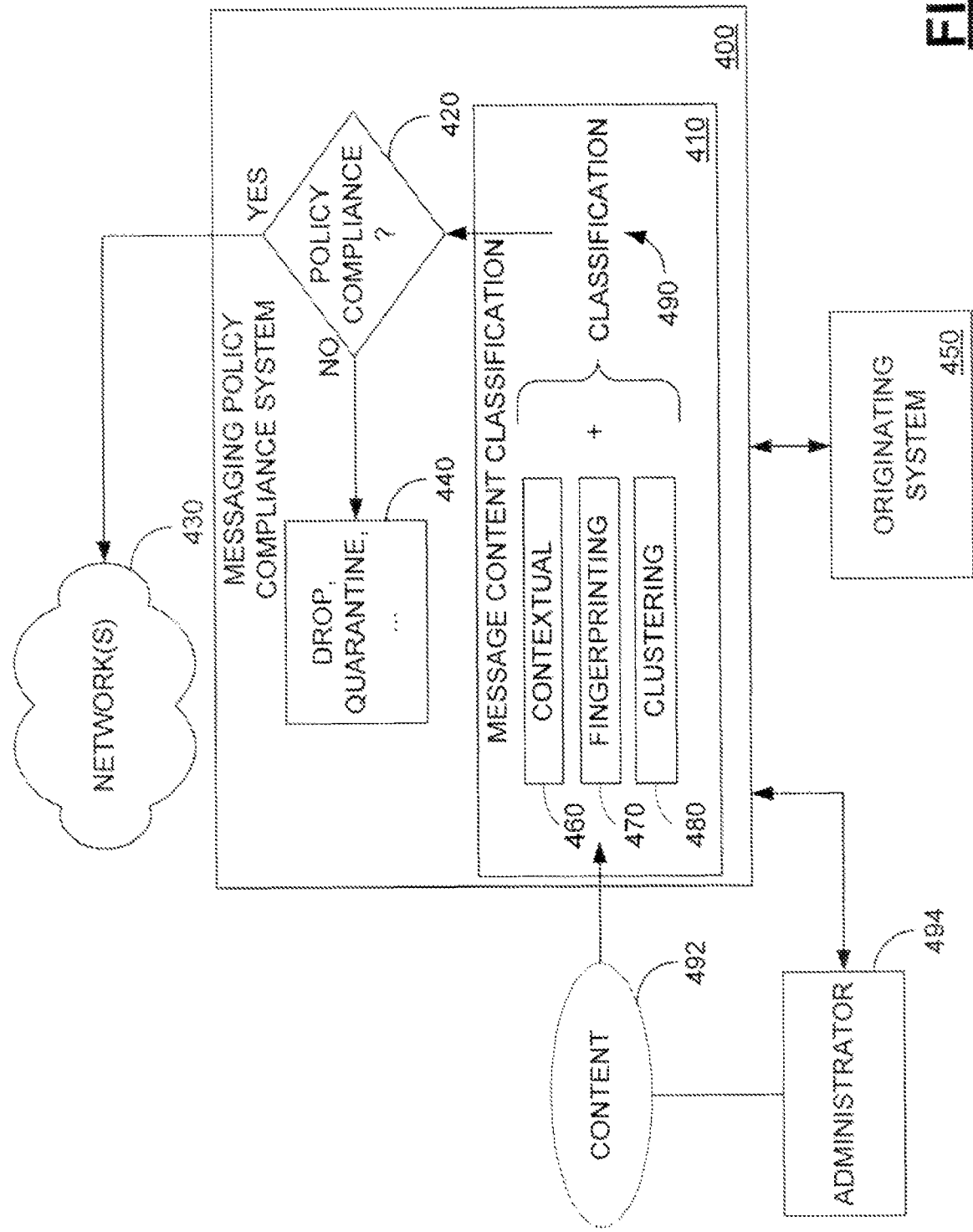
FIG. 5 is a block diagram depicting a compliance system that has been configured to use existing content to develop characteristics associated with a class.

As shown in FIG. 5, a message compliance system 400 could be configured to example an existing set of related files 492, as specified by an administrator 494, to create identification characteristics associated with the set of related files 492. The files 492 could be supplied to the message content classification program 410. The message content classification program 410 could use each of the techniques 460, 470, 480 on the set of related files to determine what features or characterizations mark their relationship. For example, legal documents might often include Latin phrases such as in re, ipso facto, or prima facie. Such an inclusion could be discoverable by a message content classification program 410.

A message content classification program 410 can generate a set of identifying characteristics for a class of content. The same techniques 460, 470, 480 are then used on communications entering the messaging policy compliance system 400. The characteristics of the communication may then be compared to the identifying characteristics for a class of content to determine in which class (if any) the content of the communication belongs, thereby producing a content classification 490 for the communication. The messaging policy compliance system 400 then applies any policies related to the content classification, as shown by decision block 420, to determine whether the communication will be delivered via network 430, or dropped, quarantined, etc. as shown by block 440. In the event that a communication does not satisfy policy, the originating system 450 can be alerted to the policy failure. The messaging content compliance system could also notify a system administrator and/or sender of the policy failure.

Figure 6:
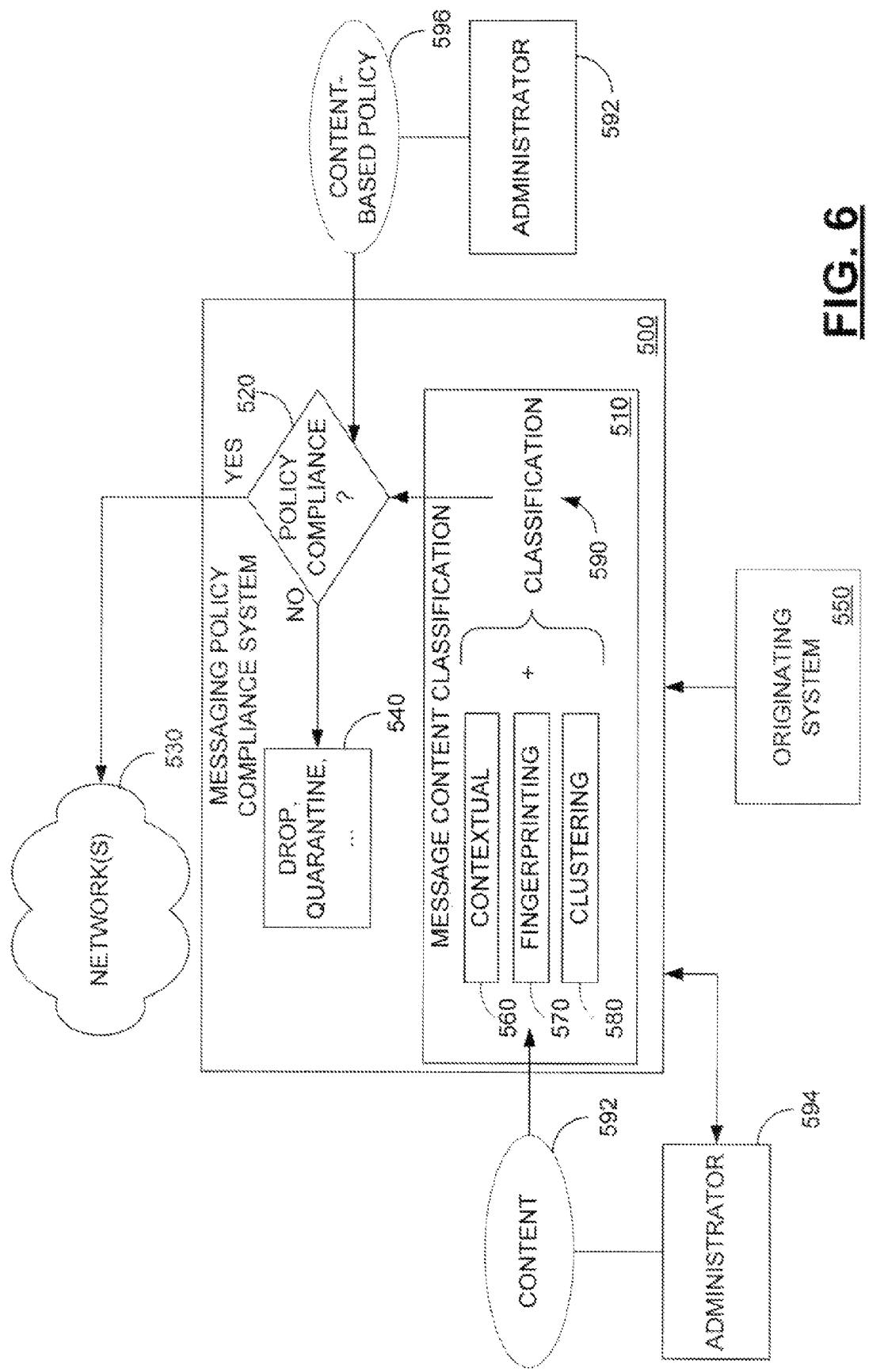
FIG. 6 is a block diagram depicting a compliance system that has been configured to accept one or more content based policies from an administrator.

It should be recognized that content policy can be created in a myriad of ways. For example, as shown in FIG. 6, the messaging policy compliance system can accept content based policies 596 from a system administrator 594. The administrator 594 can supply a content policy by supplying both the related content 592 for the message content classification program 510, and supplying a set of policy rules 596 configured to be parsed by a policy compliance decision block 520.

It should also be recognized that a messaging policy compliance system can be set up to inspect access control right of users authorized to access a set of related files. These access control rights can be used to automatically analyze content-based policy, where the users (who are authorized) view and/or modify the set of related files also have the ability to send and/or receive such similar content as they are allowed to access.

Furthermore, it should be recognized that a messaging policy compliance system can be trained for recognizing content-based anomalous behavior associated with the users of the system. For example, a messaging policy compliance system can observe all communications sent through the system over a period of time. Then, upon detecting that a user is sending communications that include content that is abnormal with respect to the historical usage patterns of that user, the messaging policy compliance system can be configured to drop/quarantine the communication and/or notify a system administrator. In an adaptive manner, a messaging policy compliance system can generate content-based policy(ies) based upon historical usage of content.

Figure 7:
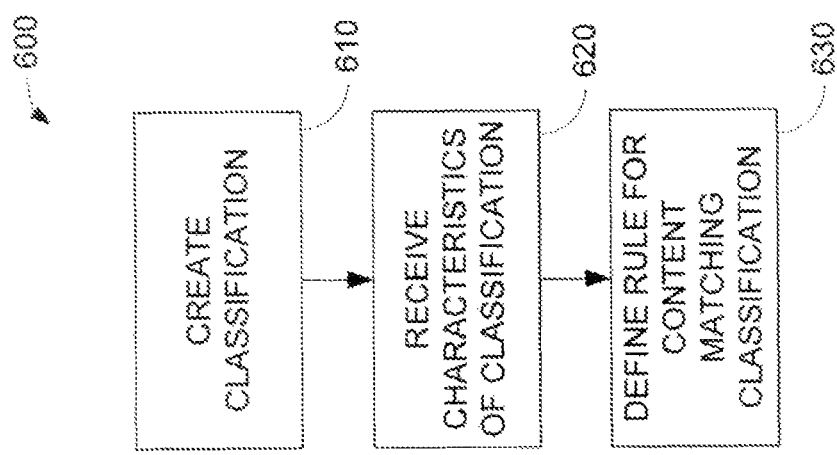
FIG. 7 is a flowchart depicting an operational scenario for allowing content based policy(ies).

FIG. 7 depicts a flowchart illustrating an operational scenario 600 for a messaging policy compliance system, whereby a system administrator can define content-based policy. At step 610, a system administrator creates a classification of content. For example, classifications could include, engineering content, medical records content, human resources content, legal content, marketing content, accounting content, forecasting content, etc.

A messaging policy compliance system could then receive a set of characteristics associated with the created classification, as shown at step 620. It should be noted that these characteristics could be internally generated, or received from another system. At step 630, the operation scenario allows an administrator to define a rule or policy for communications that include content that matches the characteristics associated with the created classification, whereby a message filtering system could be configured to block messages that do not comply with the defined rule/policy.

Figure 8:
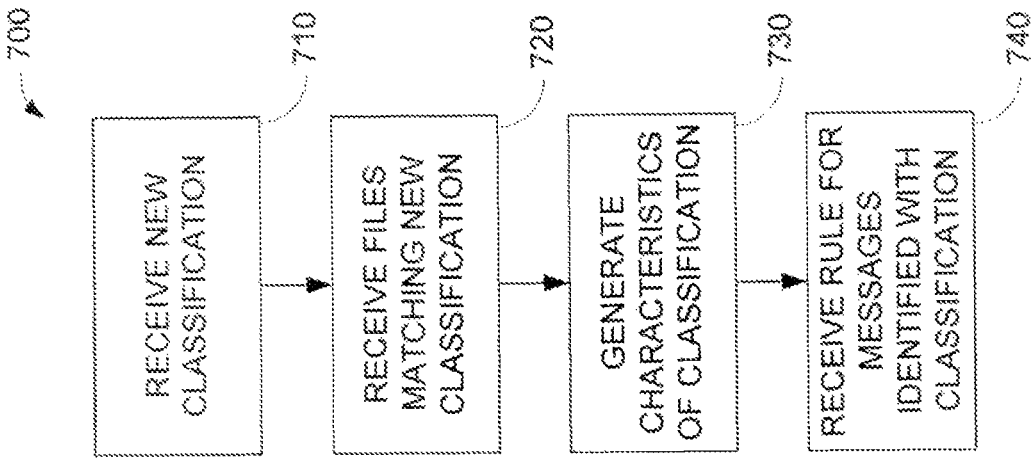
FIG. 8 is a flowchart depicting an operational scenario for allowing content based policy(ies) whereby the characteristics of the content are automatically generated based upon a set of related files associated with a classification.

FIG. 8 depicts a flowchart illustrating an operational scenario 700 for a messaging policy compliance system, whereby a system administrator can define content-based policy for communications by supplying a set of related files. At step 710, the messaging policy compliance system receives a new classification from the administrator. At step 720, the system administrator provides a set of related files which exemplify the new classification. The messaging policy compliance system generates a set of characteristics associated with the set of related files, as shown by step 730. At step 740, the messaging policy compliance system receives a rule for communications identified as belonging to the new classification.

Figure 9:
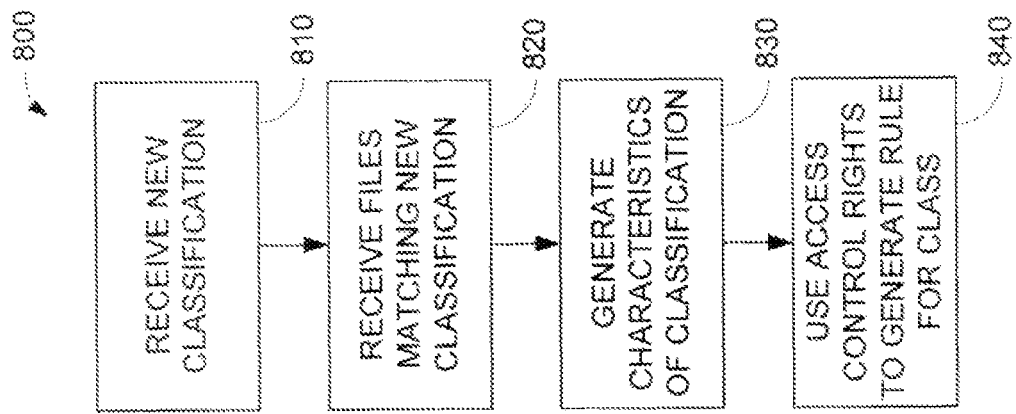
FIG. 9 is a flowchart depicting an operational scenario for generating content based policy compliance using access control rights to generate policy.

Another example of an operational scenario 800 for a messaging policy compliance system is shown in FIG. 9. At step 810, an administrator provides a new classification to the messaging policy compliance system. At step 820, the administrator provides a set of related files which correspond to new classification provided at step 810. The messaging policy compliance system then generates a set of characteristics that distinguish the set of related files from other types/classes of files, as shown by step 830. The messaging policy compliance system then examines the access control rights of each of the related files in order to develop content-based policy, thereby allowing users with access to the set of related files to send content which shares distinguishing characteristics with the related files.

Figure 10:
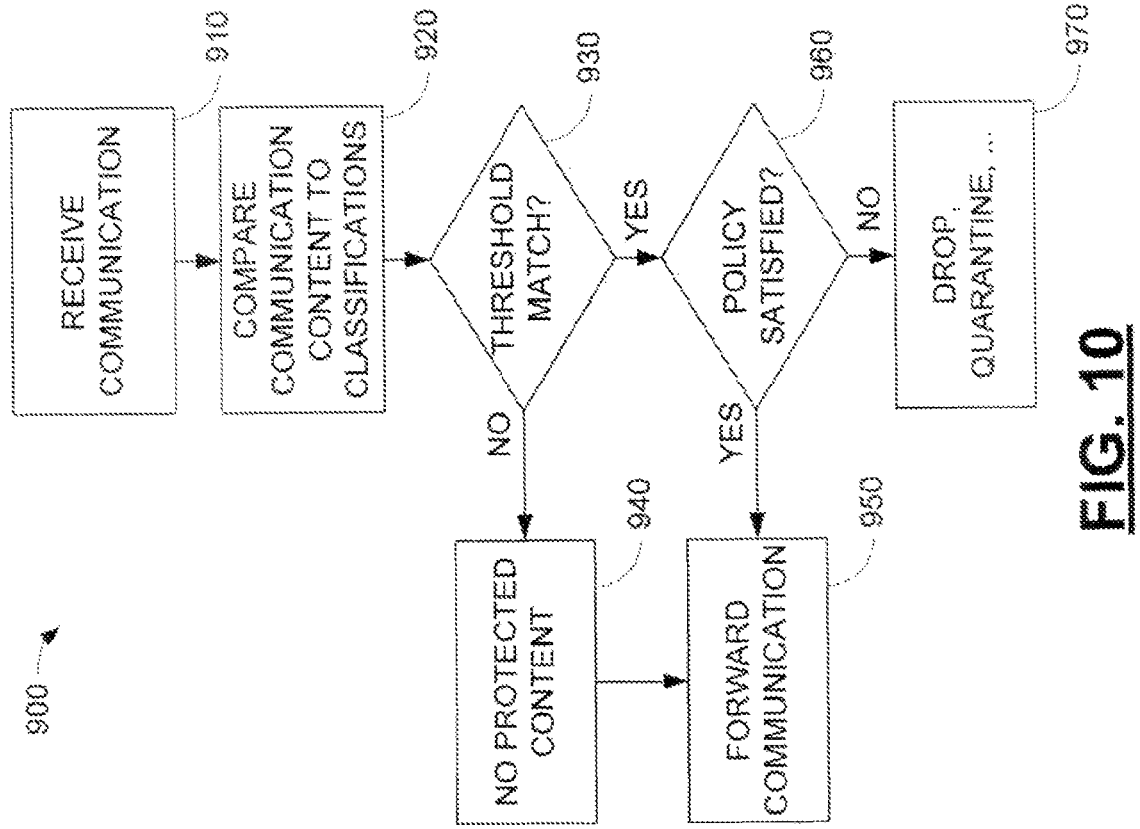
FIG. 10 is a flowchart depicting an operational scenario for filtering messages based upon content based policy(ies).

A messaging policy compliance system can filter messages, for example, as shown by the operational scenario 900 in FIG. 10. At step 910, a communication is received. At step 910, the content of the communications is compared to existing classifications. This is done, for example, by using one or more techniques that attempt to match elements of the content to sets of characteristics associated with the existing classifications. At decision block 930, the messaging policy compliance system determines whether a threshold match has been made to identify the communication content as being related to the existing classifications.

Where the messaging policy compliance system is unable to discover a threshold match between the content and the existing classifications, the communication is determined to contain no protected content as shown by step 940. Communications which contain no protected content can be forwarded to the recipient(s), as shown by step 950.

However, where the messaging policy compliance system determines there is a threshold match between the content of the communication and the existing classifications, the communication is examined to determine if content-based policy is satisfied, as shown by decision block 960. Where the content-based policy is not satisfied, the communication is quarantined, dropped, or otherwise blocked by the system, as shown in step 970. Where the content-based policy is satisfied, the communication is forwarded to the one or more systems associated with the intended recipient(s).

FIG. 11 depicts an alternative operational scenario 980 used to parse communication prior to forwarding the messaging to a recipient. At step 982, a communication is received. At step 984, the communication is normalized. Normalization in various examples, can include converting the communication to a common protocol. For example, where the system receives a VoIP packet, the communication could be converted to another format (e.g., a text based format) for examination. It should be understood that communications in any format can be converted to any other format for passing, and that the present disclosure is not limited to converting all varied protocol to any particular protocol, but that the choice of a common comparison protocol is merely a design choice to be made in light of the circumstances of a particular solution (e.g., where the primary communication mechanism is VoIP, the common comparison protocol may be chosen to be VoIP to reduce the resources used for protocol translation).

In various examples, normalization can also include translating a communication from a variety of languages into a common comparison language. For example, where a communication is in German, comparison techniques would not detect a classification match where the classification has been defined by English language documents. Thus, for a more complete analysis of all communications, communications can be translated to a common comparison language. It should be understood that this disclosure is not limited to a particular common comparison language. Moreover, it should be understood that the common comparison language may not even be a practiced language, but may merely be a language that is created by a user which has special characteristics that aid in classification of the communication. Further, the common comparison language in various examples may include a combination of several different languages, such as where discrete concepts used in different languages are not adequately described by a single language.

In step 986, the operational scenario 980 generates metadata related to the communication. The metadata can distill the files into identifying characteristics and reduce superfluous language which may not be helpful in associating the communication with any of the classifications. For example, definite and indefinite article, pronouns, and various other linguistic devices are often irrelevant to classification of a file. At step 988, the metadata associated with the communication is compared to existing metadata triggers to determine a classification associated with the communication. At decision block 990, the messaging policy compliance system determines whether a threshold match has been made to identify the communication metadata as being related to the existing classification metadata.

Where the messaging policy compliance system is unable to discover a threshold match between the content and the existing classifications, the communication is determined to contain no protected content as shown by step 992. Communications which contain no protected content can be forwarded to the recipient(s), as shown by step 994.

However, where the messaging policy compliance system determines there is a threshold match between the content of the communication and the existing classifications, the communication is examined to determine if content-based policy is satisfied, as shown by decision block 996. Where the content-based policy is not satisfied, the communication is quarantined, dropped, or otherwise blocked or delayed by the system, as shown in step 998. Where the content-based policy is satisfied, the communication is forwarded to the one or more systems associated with the intended recipient(s).

The system and methods disclosed herein are presented only by way of example and are not meant to limit the scope of the invention. Other variations of the systems and methods described above will be apparent to those skilled in the art and as such are considered to be within scope of the invention. For example, a system and method can be configured to handle many different types of communications, such as legitimate messages or unwanted communications or communications violative of a pre-selected policy. As an illustration, a communication could include a type of content as recognized by the system, and a policy could include a corporate communication policy, a messaging policy, a legislation or regulatory policy, or an international communication policy.

As an example of an architecture the could be used in accordance with systems and methods disclosed herein, an originating system 1000, a receiving system 1010, and a messaging policy compliance system 1020 can each be connected via one or more networks, as shown by FIG. 12. The originating system 1000 can send a communication to the receiving system 1010 via the messaging policy compliance system and network(s) 1030. The messaging policy compliance system 1030 would then be operable forward the message to the receiving system 1010 via network(s). It should be understood that network(s) 1030 can include many subnets including but not limited to wireless networks, local area network, wide area networks, metropolitan area networks, corporate intranets, and combinations thereof.

It should also be noted that originating system 1000 and/or receiving system 1010 can include an electronic mail server and/or client, an instant messaging server and/or client, a voice over internet protocol (VoIP) server and/or client, a gopher server and/or client, a file transfer protocol (FTP) server and/or client, a hypertext transfer protocol (HTTP) server and/or client, and combinations thereof, among many other existing network communications protocols.

Figure 13:
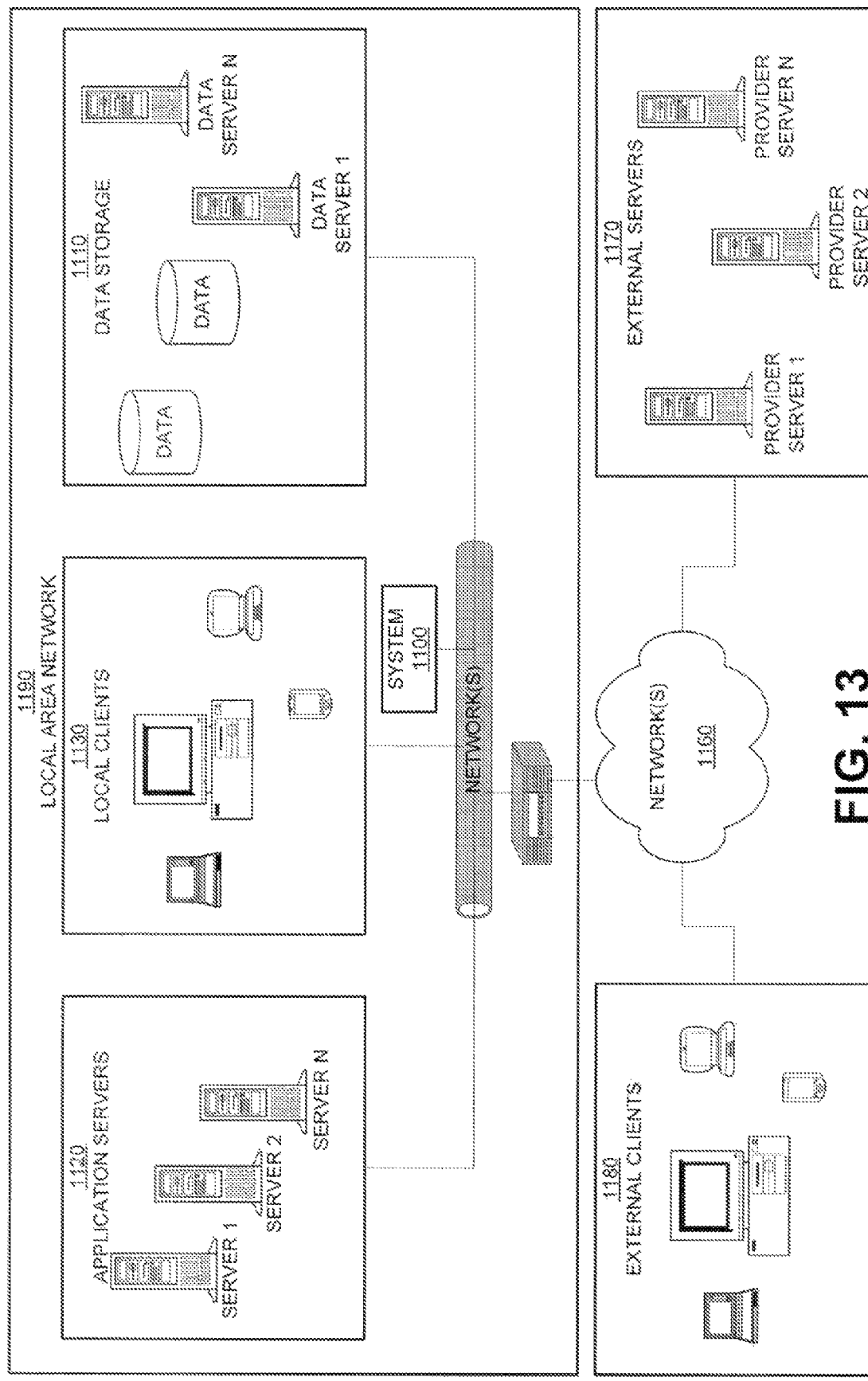
FIG. 13 is a block diagram depicting another server access architecture.

As another example of the wide scope and variations of systems and methods disclosed herein, the systems and methods may be implemented on various types of computer architectures, such as for example on different types of networked environments. As an illustration, FIG. 13 depicts a server access architecture within which the disclosed systems and methods may be used (e.g., as shown at 1100 in FIG. 8). The architecture in this example includes a corporation's local network 1190 and a variety of computer systems residing within the local network 1190. These systems can include application servers 1120 such as Web servers and e-mail servers, user workstations running local clients 1130 such as e-mail reader and Web browsers, and data storage devices 1110 such as databases and network connected disk. These systems communicate with each other via a local communication network such as Ethernet 1150. Firewall system 1140 resides between the local communication network and Internet 1160. Connected to the Internet 1160 are a host of external servers 1170 and external clients 1180. It should be understood that the present disclosure can any variety of network, including, but not limiting to an intranet, wireless network, wide area networks, local area networks, and combinations thereof, in order to facilitate communication between components.

Local clients 1130 can access application servers 1120 and shared data storage 1110 via the local communication network. External client 1180 can access external application servers 1170 via the Internet 1160. In instances where a local server 1120 or a local client 1130 requires access to an external server 1170 or where an external client 1180 or an external server 1170 requires access to a local server 1120, electronic communications in the appropriate protocol for a given application server flow through "always open" ports of firewall system 1140.

A system 1100 as disclosed herein may be located in a hardware device or on one or more servers connected to the local communication network such as Ethernet 1180 and logically interposed between the firewall system 1140 and the local servers 1120 and clients 1130. Application-related electronic communications attempting to enter or leave the local communications network through the firewall system 1140 are routed to the system 1100.

System 1100 could be used to handle many different types of e-mail and its variety of protocols that are used for e-mail transmission, delivery and processing including SMTP and POP3. These protocols refer, respectively, to standards for communicating e-mail messages between servers and for server-client communication related to e-mail messages. These protocols are defined respectively in particular RFC's (Request for Comments) promulgated by the IETF (Internet Engineering Task Force). The SMIP protocol is defined in RFC 1221, and the POP3 protocol is defined in RFC 1939.

Since the inception of these standards, various needs have evolved in the field of e-mail leading to the development of further standards including enhancements or additional protocols. For instance, various enhancements have evolved to the SMTP standards leading to the evolution of extended SMTP. Examples of extensions may be seen in (1) RFC 1869 that defines a framework for extending the SMTP service by defining a means whereby a server SMTP can inform a client SMTP as to the service extensions it supports and in (2) RFC 1891 that defines an extension to the SMTP service, which allows an SMTP client to specify (s) that delivery status notifications (DSNs) should be generated under certain conditions, (b) whether such notifications should return the contents of the message, and (c) additional information, to be returned with a DSN, that allows the sender to identify both the recipient(s) for which the DSN was issued, and the transaction in which the original message was sent.

In addition, the IMAP protocol has evolved as an alternative to POP3 that supports more advanced interactions between e-mail servers and clients. The protocol is described in RFC 2060.

Other communication mechanisms are also widely used over networks. These communication mechanisms include, but are not limited to, Voice Over IP (VoIP) and Instant Messaging. VoIP is used in IP telephony to provide a set of facilities for managing the delivery of voice information using the Internet Protocol (IP). Instant Messaging is a type of communication involving a client which hooks up to an instant messaging service that delivers communications (e.g., conversations) in realtime.

It is further noted that the systems and methods disclosed herein may use data signals conveyed via networks (e.g., local network, wide are network, internet, etc.), fiber optic medium, carrier waves, wireless networks, etc. for communication with one or more data processing devices. The data signals can carry any or all of the data disclosed herein that is provided to or from a device.

Additionally, methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems' and methods' data (e.g., associations, mapping, etc.)may be stored and implemented in one or more different types of computer-implemented ways, such as different types of storage devices and programming constructs (e.g., data stores, RAM, ROM. Flush memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

It should be understood that as used in the description herein and throughout the claims that follow, the meaning of "a," "and," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise; the phrase "exclusive or" may be used indicate situation where only the disjunctive meaning may apply.

What is claimed is:

1. A method for operation upon one or more data processors to filter communications based upon content based policy compliance, the method comprising:

for each of a plurality of sets of pre-existing files, defining a corresponding classification to be associated with the set of pre-existing files, the corresponding classification classifying content of the set of files as being associated with at least one of a plurality of departments of a business;

processing each of the sets of pre-existing files by one or more classification techniques;

generating a set of identifying characteristics for each corresponding classification, each set of identifying characteristics based on the set of pre-existing files associated with the corresponding classification;

for each of the plurality of corresponding classifications, receiving a rule specifying treatment of content identified as associated with the classification based on the set of known identifying characteristics; and wherein each rule defines whether to forward a communication including content to a recipient based upon the classification of the content and at least one of the recipient and the sender.

2. The method of claim 1, wherein the set of identifying characteristics associated with each correspond classification are generated by examining the content of the set of files associated with the corresponding classification.

3. The method of claim 2, wherein the processing each of the sets of pre-existing files includes fingerprinting analysis, a cluster analysis, a contextual analysis, and an adaptive lexical analysis.

4. The method of claim 1, wherein the rule is generated according to access control rights associated with at least one of the sender or the recipient, wherein the access control rights are derived from access control rights associated with the set of files.

5. The method of claim 4, wherein the access control rights associated with the set of files controls who can view the files.

6. The method of claim 1, wherein the rule is defined based upon access control rights associated with at least one of the sender or the recipient and content contained in a communication.

7. The method of claim 6, wherein access control rights are provided to groups of users, wherein the sender and the recipient are included in at least one group of users.

8. The method of claim 1, further comprising the steps of:
receiving a communication from an originating system;
extracting identifying characteristics associated with the communication;
comparing the communication's identifying characteristics with the set of identifying characteristics for each of the corresponding classification to identify a classification to be associated with the communication; and
applying a rule associated with the corresponding classification, the rule specifying whether the communication should be forwarded to its intended recipient.

9. The method of claim 8, further comprising the step of forwarding the communication based upon application of the rule.

10. The method of claim 8, further comprising the step of forwarding the communication responsive to the communication not being associated with any identifying characteristics.

11. The method of claim 8, further comprising the step of automatically generating a rule responsive to learning communications patterns between a group of users and based on types of content being distributed among the group of users.

12. The method of claim 11, wherein the users belong to the same organization.

13. The method of claim 8, further comprising delaying delivery of the communication based upon application of the rule.

14. The method of claim 13, further comprising notifying an originator of the communication responsive to delivery of the communication being delayed.

15. The method of claim 14, wherein the delay is at least one of storing the communication in a quarantine folder, dropping the communication, temporarily rejecting the communication, storing the communication until approval is received from an administrator to forward the communication, automatically encrypting the communication, notifying an administrator, notifying a recipient, or combinations thereof 16. The method of claim 8, further comprising converting a communication from one of a plurality of mismatched formats to a comparison format prior to extracting identifying characteristics from the communication.

17. The method of claim 8, further comprising translating a file or communication into a common language or format prior to extracting identifying characteristics or generating the known identifying characteristics.

18. The method of claim 17, wherein the translating step creates metadata to be used in extracting identifying characteristics.

19. The method of claim 8, further comprising the steps of:
observing communication traffic;
identifying one or more patterns exhibited by observed communication traffic; and
generating a rule based upon the identified one or more patterns.

20. The method of claim 19, wherein a communication falling outside of one or more identified traffic patterns is sent to a quarantine folder, dropped, temporarily rejected, stored until approval is received from an administrator to forward the communication, automatically encrypted, a recipient is notified, a sender is notified, or combinations thereof.

21. The method of claim 1, wherein the corresponding classifications are at least one of: management files, legal files, technical files, marketing files, financial files, information technology files, proprietary files, strategy files, sensitive files, or government classified files.

22. The method of claim 1, wherein a system administrator specifies the rule by selecting a corresponding classification of files for application of the rule, selecting a class of users who are permitted to send the selected classification of files, and selecting a class of users who are permitted to receive the selected classification of files.

23. The method of claim 22, wherein the steps of selecting a class of users comprises selecting individual users who have permission to send or receive the selected classification of files.

24. A content-based policy compliance system configured to filter messages based upon content and at least one of senders or recipients associated with the messages, the system comprising:
a messaging content classifier configured to:
access a plurality of sets of pre-existing files and for each set of pre-existing files define corresponding classification to be associated with the set of pre-existing files, the corresponding classification classifying content of the set of files as being associated with at least one of a plurality of departments of a business;
processing each of the sets of pre-existing files by one or more classification techniques;
generating a set of identifying characteristics for each corresponding classification, each set of identifying characteristics based on the set of pre-existing files associated with the corresponding classification;
receive a message and classify the message as associated with at least one of the corresponding classifications associated with the business departments based upon the content of the message and the sets of identifying characteristics of the plurality of content classifications;
a messaging filter configured to receive the at least one corresponding classification from the messaging content classifier and to apply a rule to the message based upon the at least one corresponding classification and upon at least one of a sender or recipient of the message; and
forwarding logic configured to transmit the message responsive to output from the messaging filter.

25. The system of claim 24, further comprising a user interface configured to receive the plurality of files and the specified classification from a user and provide the plurality of files and the specified classification to the messaging content classifier.

26. The system of claim 25, wherein the user interface is further configured to allow a user to specify rules for the messaging filter.

27. The system of claim 26, wherein the rules specify which classes of individuals are permitted to send and receive a specified content classification associated with the rule.

28. The system of claim 27, wherein the messaging content classifier is configured to use one or more of the following identification techniques to identify commonalities between the plurality of files as well as to classify messages with one of the plurality of classes: a fingerprinting analysis, a cluster analysis, a contextual analysis, and an adaptive lexical analysis.

29. The system of claim 24, wherein the forwarding logic is operable to forward the message to a recipient, quarantine the message, drop the message, or encrypt the message before forwarding the message to a recipient.

30. The system of claim 24, wherein the system is a messaging client, wherein the messaging client periodically receives updates from a messaging server comprising at least one of update rules, updated content classifications, or updated identifying characteristics for the content classifications.

31. The system of claim 24, wherein the message comprises an e-mail communication, an instant messaging communication, an HTTP communication, an FTP communication, a WAIS communication, a telnet communication, a Gopher communication, or a voice over internet protocol communication.

32. Computer readable storage media storing instructions that upon execution by a system processor cause the system processor to filter communications transmitted over a communication network based upon the content of a communication and upon the sender and recipient(s) of the communication, the media having stored instruction that cause the system processor to perform operations comprising:
for each of a plurality of sets of pre-existing files, defining a corresponding classification to be associated with the set of pre-existing files, the corresponding classification classifying content of the set of files as being associated with at least one of a plurality of departments of a business;
processing each of the sets of pre-existing files by one or more classification techniques;
generating a set of identifying characteristics for each corresponding classification, each set of identifying characteristics based on the set of pre-existing files associated with the corresponding classification;

for each of the plurality of corresponding classifications, receiving a rule specifying treatment of content identified as associated with the classification based on the set of known identifying characteristics; and wherein each rule defines whether to forward a communication including content to a recipient based upon the classification of the content and at least one of the recipient and the sender.

receiving a communication from a user, the communication containing an originating address, a receiving address, and content;

determining whether the content of the communication substantially matches any of the corresponding classifications based upon the sets of known identifying characteristics associated with the corresponding classifications, respectively; and forwarding the communication responsive to the rule associated with the substantially matched corresponding classification, wherein the rule specifies an action to perform on the communication based upon the corresponding classification of the communication and upon the originating address and the receiving address of the communication.

* * * * *

UNITED STATES PATENT AND TRADEMARK OFFICE
CERTIFICATE OF CORRECTION

PATENT NO. : 7,903,549 B2
APPLICATION NO. : 11/383347
DATED : March 8, 2011
INVENTOR(S) : Paul Judge It is certified that error appears in the above-identified patent and that said Letters Patent is hereby corrected as shown below:

Claim 13. Column 13, Line 12, after "thereof" insert -- . --.

Claim 31. Column 15, Line 8, delete "sender." and insert -- sender; --.

Signed and Sealed this
Twenty-seventh Day of September, 2011

David J. Kappos
*Director of the United States Patent and Trademark Office*